(12) United States Patent
Watanabe

(10) Patent No.: US 8,643,945 B2
(45) Date of Patent: Feb. 4, 2014

(54) INFRARED LIGHT REFLECTOR

(75) Inventor: Hidetoshi Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 212 days.

(21) Appl. No.: 13/215,767

(22) Filed: Aug. 23, 2011

(65) Prior Publication Data

US 2012/0050847 A1 Mar. 1, 2012

(30) Foreign Application Priority Data

Aug. 24, 2010 (JP) ................. 2010-187305

(51) Int. Cl.
*F21V 9/04* (2006.01)
*G02B 5/26* (2006.01)
*G02B 5/20* (2006.01)

(52) U.S. Cl.
CPC .................... *G02B 5/208* (2013.01)
USPC .......................... 359/359; 359/352

(58) Field of Classification Search
None
See application file for complete search history.

(56) References Cited

U.S. PATENT DOCUMENTS

2007/0146887 A1 * 6/2007 Ikeda et al. ............... 359/586

FOREIGN PATENT DOCUMENTS

| JP | 2005-99248 A | 4/2005 |
| JP | 3900987 B2 | 4/2007 |
| JP | 4109914 B2 | 7/2008 |
| JP | 4216568 B2 | 1/2009 |

\* cited by examiner

*Primary Examiner* — Derek S Chapel
(74) *Attorney, Agent, or Firm* — Birch, Stewart, Kolasch & Birch, LLP

(57) ABSTRACT

An infrared light reflector having an infrared light reflective layer formed by polymerizing an infrared light reflective layer composition that contains a polyfunctional polymerizable compound, a cholesteric liquid crystal compound and a fluorine-containing alignment controlling agent in an amount of at least 60 ppm relative to the liquid crystal compound, wherein when a functional layer composition is applied onto at least one surface of the infrared light reflective layer, the number of the coating liquid cissing defects having a diameter of at least 5 μm is at most $10/m^2$.

37 Claims, 1 Drawing Sheet

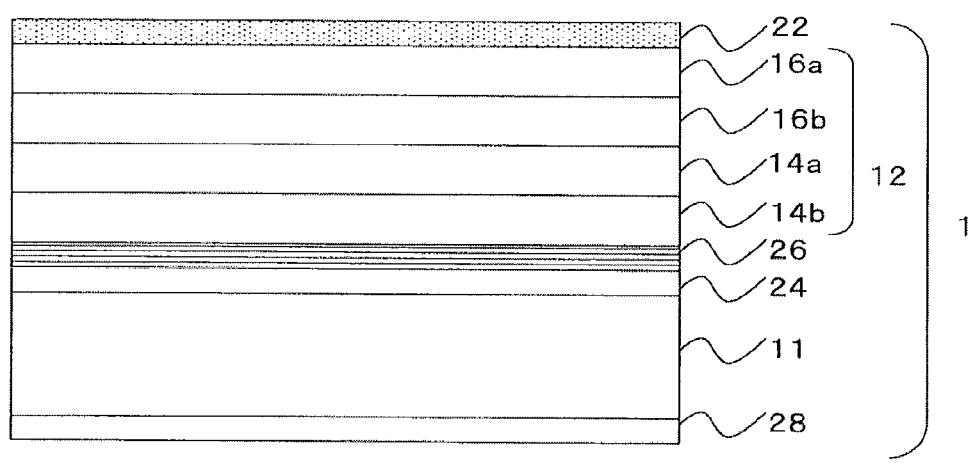

INFRARED LIGHT REFLECTOR

CROSS-REFERENCE TO RELATED APPLICATIONS

The present application claims the benefit of priority from Japanese Patent Application No. 2010-187305, filed on Aug. 24, 2010, the contents of which are herein incorporated by reference in their entirety.

BACKGROUND OF THE INVENTION

1. Field of the Invention

The present invention relates to an infrared light reflector. Precisely, the invention relates to an infrared light reflector having an infrared light reflective layer containing a cholesteric liquid crystal compound, which is used mainly for heat shields for windowpanes in buildings, vehicles, etc.

2. Description of the Related Art

Recently, with the increase in the interest in environment and energy, the needs for energy-saving industrial products are high, and as one of them, glass and films are desired that are effective for heat shields for windowpanes in houses, cars and the like, or that is, for reducing thermal load from sunlight through windowpanes. For reducing the thermal load from sunlight, it is necessary to prevent transmission of the sun's rays in any of the visible range or IR range of the sunlight spectrum.

A method of using a cholesteric liquid crystal phase in an infrared light reflector has been proposed. For example, as disclosed in Patent Reference 1, by forming one cholesteric liquid crystal layer on both sides of a λ/2 plate, a light circularly-polarized in one direction can be selectively and efficiently reflected within a range of from 700 to 1200 nm of the sunlight spectrum.

For producing an infrared light reflector capable of selectively reflecting the light in a broad range of the sunlight spectrum, generally employed is a laminated cholesteric liquid crystal layer formed by laminating a number of cholesteric liquid crystal layers in a mode of coating (see Patent Reference 2).

Patent Reference 2 discloses a coating composition for forming a liquid crystal layer, which contains a cholesteric liquid crystal material and a solvent and in which the solvent has a specific composition. In this, the coating composition is applied onto a substrate to form thereon a smooth liquid crystal layer with no trouble of coating unevenness. In addition, the patent reference further discloses addition of any other polymerizable compound than polymerizable liquid crystal material for the purpose of enhancing the physical properties or the chemical properties of the liquid crystal layer, concretely exemplifying a bisphenol A-type epoxy resin, etc.

On the other hand, Patent Reference 3 discloses a liquid crystal composition for cholesteric liquid crystal containing a specific rod-shaped liquid crystal compound, though nothing is referred to therein relating to the number of the layers to be laminated. In this, liquid crystalline polymerizable compounds, polyfunctional polymerizable compounds and others are shown as examples of the polymerizable compound that differs from the specific rod-shaped liquid crystal compound. In Examples in the patent reference, disclosed is increase in the surface hardness through addition of the polymerizable compound that differs from the specific rod-shaped liquid crystal compound.

On the other hand, recently, for controlling the alignment of a liquid crystal compound, addition of a fluorine-containing alignment controlling agent has become investigated (Patent Reference 4). However, there have been known few cases of adding a fluorine-containing alignment controlling agent to a coating composition for an infrared light reflector having an infrared light reflective layer containing a cholesteric liquid crystal compound.

Patent Reference 1: Japanese Patent 4109914
Patent Reference 2: Japanese Patent 4216568
Patent Reference 3: Japanese Patent 3900987
Patent Reference 4: JP-A 2005-99248

SUMMARY OF THE INVENTION

Given the situation, the present inventors tried producing an infrared light reflector having a laminate configuration of cholesteric liquid crystal layers by coating with a coating liquid prepared by adding a fluorine-containing alignment controlling agent to a cholesteric liquid crystal compound, but have found that, in coating with the next layer on the layer that contains a fluorine-containing alignment controlling agent, there occurs a problem of cissing failure in coating.

An object of the invention is to provide an infrared light reflector having an infrared light reflective layer containing a liquid crystal compound, which is free from a problem of cissing failure in coating on the surface of the infrared light reflective layer.

For solving the above-mentioned problems, the inventors have assiduously studied and, as a result, have found that even in a case where a specific amount of a fluorine-containing alignment controlling agent is added to the polymerizable liquid crystal compound, when a polyfunctional polymerizable compound is added, then the above-mentioned problems can be solved. Based on this finding, the inventors have completed the present invention.

The means for solving the problems are as follows:

[1] An infrared light reflector having an infrared light reflective layer formed by polymerizing an infrared light reflective layer composition that contains a polyfunctional polymerizable compound, a cholesteric liquid crystal compound and a fluorine-containing alignment controlling agent in an amount of at least 60 ppm relative to the liquid crystal compound, wherein when a functional layer composition is applied onto at least one surface of the infrared light reflective layer, the number of the coating liquid cissing defects having a diameter of at least 5 μm is at most $10/m^2$.

[2] The infrared light reflector of [1], wherein the coating thickness after curing of the functional layer composition is from 1 to 10 μm.

[3] The infrared light reflector of [1] or [2], wherein the functional layer composition contains a polyfunctional polymerizable compound.

[4] The infrared light reflector of anyone of [1] to [3], wherein the contact angle (to pure water) on the surface of the infrared light reflective layer is from 85 to 100 degrees.

[5] The infrared light reflector of anyone of [1] to [4], wherein the mean value of the surface energy of at least one surface of the infrared light reflective layer is at most 40 mN/m.

[6] The infrared light reflector of anyone of [1] to [5], wherein the standard deviation a of the fluctuation in the surface energy of at least one surface of the infrared light reflective layer is at most 0.5 mN/m.

[7] The infrared light reflector of anyone of [1] to [6], wherein the surface roughness Ra of at least one surface of the infrared light reflective layer is at most 50 nm.

[8] The infrared light reflector of any one of [1] to [7], wherein the molecular weight of the polyfunctional polymerizable compound is from 350 to 2000.

[9] The infrared light reflector of anyone of [1] to [8], wherein the polyfunctional polymerizable compound contains at least one divalent aromatic ring group having from 6 to 30 carbon atoms and is non-liquid crystalline.

[10] The infrared light reflector of any one of [1] to [9], wherein the polyfunctional polymerizable compound has at least two (meth)acryloyl groups.

[11] The infrared light reflector of any one of [1] to [10], wherein the polyfunctional polymerizable compound has a structure represented by the following general formula (1):

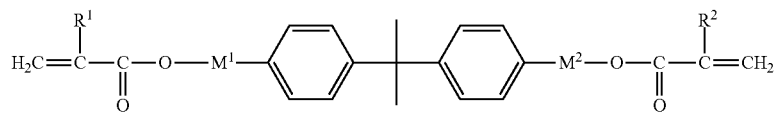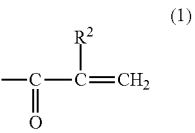

(1)

wherein $R^1$ and $R^2$ each independently represent a hydrogen atom or a methyl group; $M^1$ and $M^2$ each independently represent —$(CH_2—CH_2—O)_n$—, —$(O—CH_2—CH_2)_n$—, —$(CH_2—CH_2—CH_2—O)_m$—, —$(O—CH_2—CH_2—CH_2)_m$—, —$(CH_2)_p$— or their combination; n, m and p each independently indicate an integer of from 1 to 50.

[12] The infrared light reflector of any one of [1] to [11], wherein the blend ratio (by mass) of the polyfunctional polymerizable compound and the fluorine-containing alignment controlling agent in the infrared light reflective layer composition is from 50/1 to 1000/1.

[13] The infrared light reflector of any one of [1] to [11], wherein the blend ratio (by mass) of the polyfunctional polymerizable compound and the fluorine-containing alignment controlling agent in the infrared light reflective layer composition is from 60/1 to 900/1.

[14] The infrared light reflector of any one of [1] to [13], wherein the viscosity of the infrared light reflective layer composition is from 0.1 to 10 mPa·s.

[15] The infrared light reflector of any one of [1] to [14], wherein the total thickness of the infrared light reflective layers is from 10 to 60 μm.

[16] The infrared light reflector of any one of [1] to [15], wherein the infrared light reflective layers include from 2 to 12 cholesteric liquid crystal layers.

[17] The infrared light reflector of [16], wherein the infrared light reflective layers including from 2 to 12 cholesteric liquid crystal layers are laminated on a substrate, and the cholesteric liquid crystal layers are formed each by polymerizing a cholesteric liquid crystal layer composition, and the amount of the polyfunctional polymerizable compound contained in the cholesteric liquid crystal layer composition increases sequentially from the cholesteric liquid crystal layer composition on the side of the substrate.

[18] The infrared light reflector of [17], wherein the cholesteric liquid crystal layer composition further contains a fluorine-containing alignment controlling agent, the amount of the fluorine-containing alignment controlling agent contained in the cholesteric liquid crystal layer composition increases sequentially from the cholesteric liquid crystal layer composition on the side of the substrate, and the blend ratio (by mass) of the polyfunctional polymerizable compound and the fluorine-containing alignment controlling agent contained in all the cholesteric liquid crystal layer compositions is from 50/1 to 1000/1.

[19] The infrared light reflector of any one of [16] to [18], wherein the infrared light reflective layers include at least one cholesteric liquid crystal layer of reflecting a right circularly-polarized light and at least one cholesteric liquid crystal layer of reflecting a left circularly-polarized light.

[20] The infrared light reflector of any one of [1] to [19], wherein the elongation at rupture of the infrared light reflective layer is at least 5%.

[21] The infrared light reflector of any one of [1] to [20], wherein the stress at rupture of the infrared light reflective layer is at least 20 MPa.

According to the invention, there is provided an infrared light reflector having an infrared light reflective layer containing a liquid crystal compound, which is free from a problem of cissing failure in coating on the surface of the infrared light reflective layer.

BRIEF DESCRIPTION OF DRAWINGS

FIG. 1 is a diagrammatic view illustrating a section of an example of an infrared light reflective film of the invention. In the drawing, 1 is infrared light reflector, 11 is resin substrate, 12 is infrared light reflective layer (cl layer), 14a is light reflective layer with cholesteric liquid crystal phase fixed therein, 14b is light reflective layer with cholesteric liquid crystal phase fixed therein, 16a is light reflective layer with cholesteric liquid crystal phase fixed therein, 16b is light reflective layer with cholesteric liquid crystal phase fixed therein, 22 is easy adhesion layer, 24 is undercoat layer, 26 is alignment layer, and 28 is back layer.

BEST MODE FOR CARRYING OUT THE INVENTION

In the following, the contents of the invention are described in detail. In this description, the numerical range expressed by the wording "a number to another number" means the range that falls between the former number indicating the lowermost limit of the range and the latter number indicating the uppermost limit thereof.

[Infrared Light Reflector]

The infrared light reflector of the invention has an infrared light reflective layer formed by polymerizing an infrared light reflective layer composition that contains a polyfunctional polymerizable compound, a cholesteric liquid crystal compound and a fluorine-containing alignment controlling agent in an amount of at least 60 ppm relative to the liquid crystal compound, and is characterized in that, when a functional layer composition is applied onto at least one surface of the infrared light reflective layer, the number of the coating liquid cissing defects having a diameter of at least 5 μm is at most 10/$m^2$.

Having the configuration as above, the infrared light reflector of the invention can reduce the coating liquid cissing defects and can improve the surface condition thereof even though a specific amount of a fluorine-containing alignment controlling agent is contained in the infrared light reflective layer, and this is because the infrared light reflective layer contains a polyfunctional polymerizable compound along with the alignment controlling agent therein. Not adhering to any theory, the reason why the invention having the configuration as above can exhibit the effect would be because of the difference between the reactivity of the polymerizing group of the cholesteric liquid crystal compound and the reactivity of the polymerizing group of the polyfunctional polymerizable compound in polymerizing and curing the cholesteric liquid crystal layer to form the infrared light reflective layer. As a result, the polyfunctional polymerizable compound can be eccentrically located in the surface of the formed infrared light reflective layer or in the vicinity thereof, and therefore the distribution of the fluorine-containing alignment controlling agent, which is said to be eccentrically located in the surface of the infrared light reflective layer, can be thereby controlled and the surface energy of the infrared light reflective layer can be thereby reduced; and for these reasons, the effect of the invention could be attained.

Heretofore, the polymerizable compound of the type was added to a light reflective layer containing a cholesteric liquid crystal compound for the purpose of enhancing the film strength, as described in Patent References 2 and 3. Therefore, in case where the layer contains the fluorine-containing alignment controlling agent in an amount of 60 ppm or more relative to the liquid crystal compound therein, the fact that the effect of the invention could be attained when a polyfunctional polymerizable compound is added to the layer is an unexpected and surprising result.

The infrared light reflector of the invention is described in detail hereinunder in point of the configuration, the properties, the materials, the production method, the use and others thereof.

<Configuration>

With reference to the drawing attached hereto, one preferred embodiment of the infrared light reflector of the invention is described below.

The infrared light reflector 1 shown in FIG. 1 preferably has infrared light reflective layers (liquid crystal compound layer, CL layer) 12 on at least one side of the resin substrate 11.

Preferably, in the infrared light reflector 1 of the invention, the infrared light reflective layers 12 include infrared light reflective layers with a cholesteric liquid crystal phase fixed therein (hereinafter these may be referred to as cholesteric liquid crystal layers) 14a and 14b. However, in the invention, the order in lamination of the light reflective layers 14a and 14b from the resin substrate 11 and the number of the laminated layers are not limited to the order and the number illustrated in FIG. 1.

Preferably, the infrared light reflective layers 12 are in the form of a laminate of from 2 to 12 layers each with a cholesteric liquid crystal phase fixed therein as mentioned above.

The light reflective layers 14a, 14b, 16a and 16b are layers each with a cholesteric liquid crystal phase fixed therein, and therefore exhibit light-selective reflectivity of reflecting a light falling within a specific wavelength range based on the helical pitch of the cholesteric liquid crystal phase therein. In one embodiment of the invention, the helical direction of the cholesteric liquid crystal phase in the neighboring light reflective layers 14a and 14b is opposite to each other and the reflection center wavelength $\lambda_{14}$ thereof is the same. Similarly, the helical direction of the cholesteric liquid crystal phase in the neighboring light reflective layers 16a and 16b is opposite to each other and the reflection center wavelength $\lambda_{16}$ thereof is the same. In this embodiment, $\lambda_{14} \neq \lambda_{16}$, and therefore, the light reflective layers 14a and 14b selectively reflect a left circularly-polarized light and a right circularly-polarized light having a predetermined wavelength $\lambda_{14}$, and the light reflective layers 16a and 16b selectively reflect a left circularly-polarized light and a right circularly-polarized light at a wavelength $\lambda_{16}$ that differs from the wavelength $\lambda_{14}$, and as a whole, the light reflector of this embodiment secures wider bandwidth reflection characteristics.

In the infrared light reflector 1 shown in FIG. 1, the center wavelength $\lambda_{14}$ in selective reflection by the light reflective layers 14a and 14b may differ from the center wavelength $\lambda_{16}$ in selective reflection by the light reflective layers 16a and 16b, for example, $\lambda_{14}$ falls within a range of from 1010 to 1070 nm and $\lambda_{16}$ falls within a range of from 1190 to 1290 nm. Using the two pairs of light reflective layers, of which the selective reflection wavelength each falls within the above-mentioned range, makes it possible to improve the infrared reflection efficiency of the reflector. The general tendency of the spectral distribution of sunlight energy intensity is that the energy intensity is higher at a shorter wavelength; but the spectral distribution of the infrared light wavelength region has two energy intensity peaks, one in a wavelength range of from 950 to 1130 nm and the other in a wavelength range of from 1130 to 1350 nm. Using at least one pair of light reflective layers, of which the center wavelength of selective reflection falls within a range of from 1010 to 1070 nm (more preferably from 1020 to 1060 nm), and at least one pair of light reflective layers, of which the center wavelength of selective reflection falls within a range of from 1190 to 1290 nm (more preferably from 1200 to 1280 nm) enables more efficient reflection of light corresponding to the two peaks and, as a result, makes it possible to further enhance the heat shieldability of the reflector.

The helical pitch of the cholesteric liquid crystal phase having the above-mentioned reflection center wavelength is generally from 650 to 690 nm or so for the wavelength $\lambda_{14}$, and from 760 to 840 nm or so for the wavelength $\lambda_{16}$. The thickness of each light reflective layer may be from 1 μm to 10 μm or so (preferably from 3 to 7 μm or so). However, the range is not a limiting one. By suitably selecting and controlling the type and the concentration of the materials (mainly liquid crystal material and chiral agent) for use in layer formation, light reflective layers having a desired helical pitch can be formed. The thickness of the layers can be controlled to fall within a desired range by controlling the coating amount.

As described above, the helical direction of the cholesteric liquid crystal phase in the neighboring light reflective layers 14a and 14b is opposite to each other, and similarly, the helical direction of the cholesteric liquid crystal phase in the neighboring light reflective layers 16a and 16b is opposite to each other. In that manner, arranging the light reflective layers each comprising such a reversed cholesteric liquid crystal phase and having the same selective reflection center wavelength, adjacent to each other enables reflection of both left circularly-polarized light and right circularly-polarizing light having the same wavelength. This effect is unrelated to the optical properties of the resin substrate 11 and is attained regardless of the optical properties of the resin substrate 11. Preferably, in the infrared light reflector of the invention, the infrared light reflective layers include at least one cholesteric liquid crystal layer of reflecting a right circularly-polarized light and at least one cholesteric liquid crystal layer of reflecting a left circularly-polarized light.

For example, in case where the light having passed through the light reflective layer 16a (reflecting a right circularly-polarized light having a wavelength of $\lambda_{16}$ and transmitting a left circularly-polarized light having the same wavelength) next passes not 16b but 14a and 14b for which the selective reflection center wavelength is not $\lambda_{16}$, the left circularly-polarized light component having a wavelength of $\lambda_{16}$ shall pass through the cholesteric liquid crystal layer of which the size of the helical pitch differs from that of 16b. In this case, the left circularly-polarized light component is influenced though slightly by the influence of the optical rotation of the cholesteric liquid crystal phase in other light reflective layers, therefore bringing about a change that the wavelength of the left circularly-polarized light component is shifted. Naturally, this phenomenon is not limited to only the "left circularly-polarized light component having a wavelength of $\lambda_{16}$", but is a change to occur in a case where a certain circularly-polarized light at a certain wavelength passes through cholesteric liquid crystal phases differing in the helical pitch thereof. Though based on experimental rule data, in case where one circularly-polarized light component not reflected by a cholesteric liquid crystal layer having a predetermined helical pitch passes, still kept not being reflected, through any other cholesteric liquid crystal layer having a different helical pitch and when the number of the layers through which the light component passes is 3 or more, the negative influence of the layers on the circularly-polarized light component passing through them becomes remarkable, and after that, even though the circularly-polarized light could reach a cholesteric liquid crystal layer capable of reflecting the light, the reflectance of the layer remarkably lowers. There is no need that a pair of light reflective layers which are the same in point of the selective reflection center wavelength thereof and which differ in point of the helical direction thereof are arranged adjacent to each other; but preferably, the number of the other light reflective layers (light reflective layers each with a cholesteric liquid crystal phase fixed therein, which, however, differ both in the helical pitch and in the selective reflection center wavelength) to be disposed between the pair of light reflective layers is at most 2. Needless-to-say, preferably, the pair of light reflective layers are adjacent to each other.

The light reflective layers may be formed in various methods. One example is a coating method to be mentioned below. More concretely, a curable liquid crystal composition capable of forming a cholesteric liquid crystal phase is applied onto the surface of a substrate, an alignment layer, a light reflective layer or the like, the composition is processed to form a cholesteric liquid crystal phase, and then further cured (for example, through polymerization or crosslinking reaction) to form the intended light reflective layer.

The configuration of the cholesteric liquid crystal layers in the infrared light reflector of the invention is not limited to the embodiment illustrated in FIG. 1. Five or more light reflective layers may be laminated on one surface of the substrate; or one or more pairs of light reflective layers may be laminated on both surfaces of the substrate (at least five layers are laminated in total). In another embodiment, the infrared light reflector of the invention may have at least two pairs of light reflective layers all having the same reflection center wavelength.

Needless-to-say, the infrared light reflector of the invention may be combined with any other infrared light reflective films for the purpose of further broadening the reflection wavelength range thereof. In addition, the reflector may have any other light reflective layer that reflects a light having a predetermined wavelength based on the other principle than the selective reflection characteristics of the cholesteric liquid crystal phase therein. The members capable of being combined with the reflector of the invention include the composite films and the layers constituting them described in JP-T 4-504555, as well as the multilayer laminates described in JP-T 2008-545556, etc.

Needless-to-say, the infrared light reflector of the invention may have selective reflection characteristics in accordance with any other infrared wavelength ranges (for example, from 780 to 940 nm, from 1400 to 2500 nm) than the infrared wavelength ranges of the above-mentioned two peaks. For example, laminating additional one pair of light reflective layers each with a cholesteric liquid crystal phase fixed therein, especially laminating those each with cholesteric liquid crystal phase fixed therein in which the cholesteric liquid crystal layers have opposite optical rotation (that is, one has levorotatory and the other has dextrorotatory) makes it possible to further broaden the selective reflection wavelength range of the reflector and to further enhances the heat shieldability thereof.

In addition, the infrared light reflector 1 of the invention may have a non-light reflective layer containing an organic material and/or an inorganic material. One example of the non-light reflective layer usable in the invention includes an easy adhesion layer 22 that facilitates adhesion to any other member (for example, glass, interlayer sheet and adhesive material sheet for laminated glass). FIG. 1 shows an example of the embodiment where the infrared light reflector 1 of the invention contains the easy adhesion layer 22. Preferably, the easy adhesion layer 22 is arranged above the outermost layer 16a of the light reflective layers with a cholesteric liquid crystal phase fixed therein. In addition, an adhesive layer (not shown) may be further arranged on the easy adhesion layer 22. For example, in the embodiment where at least four light reflective layers are arranged on one surface of the substrate, the easy adhesion layer 22 may be arranged on the outermost light reflective layer 16a. The material to be used for forming the easy adhesion layer may be selected from various materials, depending on whether the easy adhesion layer is formed adjacent to the light reflective layer or whether it is formed adjacent to the substrate, or on the material of the other member to which the layer is adhered.

Other examples of the non-light reflective layer usable in the invention include an undercoat layer 24 for increasing the adhesion force between the cholesteric liquid crystal phase-having light reflective layer and the resin substrate, and an alignment layer 26 which is used in forming the light reflective layers and which more accurately defines the alignment direction of the cholesteric liquid crystal compounds in the layers. Preferably, the infrared light reflector of the invention contains at least one of the undercoat layer and the alignment layer on the side on which the infrared light reflective layers are kept in contact with the resin substrate, or in other words, it is desirable that the undercoat layer and the alignment layer are arranged between at least one light reflective layer and the resin substrate. Further, more preferably, the resin substrate 11, the undercoat layer 24, the alignment layer 26 and the light reflective layers 12 each with a cholesteric liquid crystal phase fixed therein are laminated in that order, as shown in FIG. 1. Specifically, in the infrared light reflector of the invention, the infrared light reflective layers are laminated preferably in the order of the undercoat layer 24, the alignment layer 26, and the infrared light reflective layers 12 each containing a fluorine-containing alignment controlling agent (horizontal alignment agent) and a polymerizable liquid crystal compound, from the surface thereof kept in contact with the resin substrate.

The alignment layer 26 may be arranged between the light reflective layers (its details are not illustrated).

Preferably, the total thickness of the infrared light reflective layers in the infrared light reflector of the invention is from 10 to 60 µm, more preferably from 10 to 50 even more preferably from 10 to 30 µm.

<Characteristics>
(1) Infrared Light reflective Layer:

The infrared light reflector of the invention is characterized in that, when a functional layer composition is applied onto at least one surface of the infrared light reflective layer, the number of the coating liquid cissing defects having a diameter of at least 5 μm is at most 10/m².

Not specifically defined, the functional layer may be any one capable of being laminated on the cholesteric liquid crystal layer in any known infrared light reflector with a cholesteric liquid crystal layer fixed therein. Above all, the functional layer is preferably an easy adhesion layer or an infrared light reflective layer. In the infrared light reflector of the invention, when a functional layer coating liquid capable of forming such a functional layer is applied, the number of coating liquid cissing defects is small. Therefore, the infrared light reflector of the invention is excellent in surface condition and various physical properties thereof. The type of the solvent favorably used in the coating liquid for the functional layer is not specifically defined. Preferred is use of the solvents mentioned below for the coating liquids for easy adhesion layer or infrared light reflective layer to be mentioned hereinunder.

Preferably, the number of the coating liquid cissing defects is at most 8/m², more preferably at most 3/m².

Preferably, in the infrared light reflector of the invention, the coating thickness of the functional layer composition after cured is from 1 to 10 μm, more preferably from 1 to 8 μm, even more preferably from 3 to 7 μm. The coating thickness as referred to herein means the thickness per layer, and for example, in case where three light reflective layers are additionally laminated on the lowermost light reflective layer, the total coating thickness of the functional layer compositions is preferably from 3 to 30 μm.

Preferably, in the infrared light reflector of the invention, the functional layer composition contains a polyfunctional polymerizable compound. The preferred range of the polyfunctional polymerizable compound is the same as that of the polyfunctional polymerizable compound contained in the infrared light reflective layer, which will be described hereinunder.

Preferably, in the infrared light reflector of the invention, the infrared light reflective layers including from 2 to 12 cholesteric liquid crystal layers are laminated on a substrate, the cholesteric liquid crystal layers are formed by polymerizing the corresponding cholesteric liquid crystal layer compositions, and the amount of the polyfunctional polymerizable compound in each cholesteric liquid crystal layer composition increases sequentially from the cholesteric liquid crystal layer composition on the side of the substrate, from the viewpoint that the brittleness of the reflector in bending may be stepwise attenuated by the respective cholesteric liquid crystal layers and that the brittleness in bending of the infrared light reflector as a whole can be thereby attenuated. Preferably, the number of the cholesteric liquid crystal layers (light reflective layers) is from 2 to 10, more preferably from 4 to 9, even more preferably from 4 to 6.

Preferably, in the infrared light reflector of the invention, the cholesteric liquid crystal layer composition further contains a fluorine-containing alignment controlling agent, and the amount of the fluorine-containing alignment controlling agent contained in the cholesteric liquid crystal layer composition increases sequentially from the cholesteric liquid crystal layer composition on the side of the substrate, from the viewpoint that the entire alignment of the infrared light reflector where the cholesteric liquid crystal layers are laminated is well secured. More preferably, the blend ratio (by mass) of the polyfunctional polymerizable compound and the fluorine-containing alignment controlling agent contained in all the cholesteric liquid crystal layer compositions is from 50/1 to 1000/1, more preferably from 60/1 to 900/1, even more preferably from 70/1 to 500/1, from the viewpoint that the brittleness in bending of the infrared light reflector is reduced as a whole, the alignment of the liquid crystal layers is enhanced and eventually the heat shieldability of the reflector is thereby enhanced.

Preferably, in the infrared light reflector of the invention, the elongation at rupture of the infrared light reflective layer is at least 5%, more preferably at least 6%, even more preferably at least 7%.

Preferably, in the infrared light reflector of the invention, the stress at rupture of the infrared light reflective layer is at least 20 MPa, more preferably at least 25 MPa, even more preferably at least 30 MPa.

Preferably, in the infrared light reflector of the invention, the contact angle on the surface of the infrared light reflective layer given pure water is from 85 to 100 degrees, more preferably from 88 to 96 degrees.

Preferably, in the infrared light reflector of the invention, the mean value of the surface energy of at least one surface of the infrared light reflective layer is at most 40 mN/m, more preferably at most 38 mN/m, even more preferably at most 36 mN/m.

Preferably, in the infrared light reflector of the invention, the standard deviation σ of the fluctuation in the surface energy of at least one surface of the infrared light reflective layer is at most 0.5 mN/m, more preferably at most 0.3 mN/m, even more preferably at most 0.2 mN/m.

Preferably, in the infrared light reflector of the invention, the surface roughness Ra of at least one surface of the infrared light reflective layer is at most 50 nm, more preferably at most 45 nm, even more preferably at most 40 nm.

<Materials>

Examples of the materials for producing the infrared light reflector of the invention and the production method for the reflector are described in detail hereinunder.

1. Infrared Light Reflective Layer:

In the infrared light reflector of the invention, each light reflective layer is formed by polymerizing an infrared light reflective layer composition that contains a polyfunctional polymerizable compound, a cholesteric liquid crystal compound and a fluorine-containing alignment controlling agent in an amount of at least 60 ppm relative to the liquid crystal compound.

One preferred example of the infrared light reflective layer composition contains at least a polyfunctional polymerizable compound, a cholesteric liquid crystal compound, a fluorine-containing alignment controlling agent in an amount of at least 60 ppm relative to the liquid crystal compound, an optically-active compound (chiral agent), and a polymerization initiator. The composition may contain two or more different types of each component. For example, combined use of a polymerizable liquid crystal compound and a non-polymerizable liquid crystal compound is possible here. Also, combined use of a low-molecular liquid crystal compound and a high-molecular liquid crystal compound is possible. Further, for enhancing the alignment uniformity and the coating aptitude and for increasing the film strength, the composition may contain at least one selected from various additives such as a horizontal alignment agent except fluorine-containing agents, an unevenness inhibitor, a cissing inhibitor, a polymerizing monomer, etc. Also if desired, the infrared light reflective layer composition may further contain a polymerization inhibitor, an antioxidant, a UV absorbent, a light stabilizer, a colorant, metal oxide fine particles, etc., within a range not detracting from the optical properties thereof.

(1) Cholesteric Liquid Crystal Compound:

The cholesteric liquid crystal compound usable in the invention is preferably a rod-shaped nematic liquid crystal compound. Preferred examples of the rod-shaped nematic liquid crystal compound for use herein include azomethines, azoxy compounds cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Not only low-molecular liquid crystal compounds but also high-molecular liquid crystal compounds are usable here.

Preferably, the cholesteric liquid crystal compound for use in the invention is a polymerizable one. Use of such a polymerizable cholesteric liquid crystal compound in forming an infrared light reflective layer facilitates eccentric location of the polyfunctional polymerizable compound in the surface of the infrared light reflective layer or in the vicinity thereof.

The polymerizable rod-shaped liquid crystal compound may be obtained by introducing a polymerizable group into a rod-shaped liquid crystal compound. Examples of the polymerizable group include an unsaturated polymerizable group, an epoxy group and an aziridinyl group. Preferred is an unsaturated polymerizable group, and more preferred is an ethylenic unsaturated polymerizable group. The polymerizable group may be introduced into the molecule of a rod-shaped liquid crystal compound in various methods. The number of the polymerizable groups that the polymerizable rod-shaped liquid crystal compound has is preferably from 1 to 6, more preferably from 1 to 3. Examples of the polymerizable rod-shaped liquid crystal compound includes the compounds described in Makromol. Chem., Vol. 190, p. 2255 (1989); Advanced Materials, Vol. 5, p. 107 (1993); U.S. Pat. Nos. 4,683,327, 5,622,648, 5,770,107; WO95/22586, WO95/24455, WO97/00600, WO98/23580, WO98/52905; JP-A1-272551, 6-16616, 7-110469, 11-80081, 2001-328973, etc. Two or more different types of polymerizable rod-shaped liquid crystal compounds may be used here as combined. When two or more different types of polymerizable rod-shaped liquid crystal compounds are used as combined, the alignment temperature may be lowered.

(2) Optically-Active Compound (Chiral Agent):

The composition for infrared light reflective layer exhibits a cholesteric liquid crystal phase, for which the composition preferably contains an optically-active compound. However, in case where the rod-shaped liquid crystal compound is a molecule having an asymmetric carbon atom, there may be a case where the composition could stably form a cholesteric liquid crystal phase even though an optically-active compound is not added thereto. The optically-active compound may be selected from various known chiral agents (for example, as described in Liquid crystal Device Handbook, Chap. 3, Item 4-3, Chiral Agents for TN and STN, p. 199, by the 142nd Committee of the Japan Society for the Promotion of Science, 1989). The optically-active compound generally contains an asymmetric carbon atom; however, an axial asymmetric compound or a planar asymmetric compound not containing an asymmetric carbon atom may also be used here as the chiral agent. Examples of the axial asymmetric compound or the planar asymmetric compound include binaphthyl, helicene, paracyclophane and their derivatives. The optically-active compound (chiral agent) may have a polymerizable group. In case where the optically-active compound has a polymerizable group and the rod-shaped liquid crystal compound to be used concurrently also has a polymerizable group, a polymer may be formed through polymerization of the polymerizable optically-active compound and the polymerizable rod-shaped liquid crystal compound, which has a recurring unit derived from the rod-shaped liquid crystal compound and a recurring unit derived from the optically-active compound. In this embodiment, preferably, the polymerizable group which the polymerizable optically-active compound is a group of the same type as that of the polymerizable group which the polymerizable rod-shaped liquid crystal compound. Accordingly, preferably, the polymerizable group of the optically-active compound is also an unsaturated polymerizable group, an epoxy group or an aziridinyl group, more preferably an unsaturated polymerizable group, even more preferably an ethylenic unsaturated polymerizable group.

The optically-active compound may be a liquid crystal compound.

The amount of the optically-active compound in the composition for infrared light reflective layer is preferably from 1 to 30 mol % of the liquid crystal compound therein. The amount of the optically-active compound in the composition is preferably smaller in order that the compound does not have any influence on the liquid crystallinity of the composition. Accordingly, the optically-active compound to be used as a chiral agent in the composition is preferably a compound having a strong torsion force in order that the compound could attain the desired helical pitch torsion alignment even though its amount used is small. As the chiral agent having such a strong torsion force, for example, there may be mentioned the chiral agents described in JP-A 2003-287623, and these are favorably used also in the invention.

(3) Polymerization Initiator:

The composition for infrared light reflective layer which is used for forming the infrared light reflective layer is preferably a polymerizable liquid crystal composition, for which, therefore, the composition preferably contains a polymerization initiator. One embodiment of the polymerizable liquid crystal composition is a UV-curable liquid crystal composition that contains a photopolymerization initiator capable of initiating polymerization through irradiation with UV ray. Examples of the photopolymerization initiator include α-carbonyl compounds (as described in U.S. Pat. Nos. 2,367,661, 2,367,670), acyloin ethers (as described in U.S. Pat. No. 2,448,828), α-hydrocarbon-substituted aromatic acyloin compounds (as described U.S. Pat. No. 2,722,512), polynuclear quinone compounds (as described in U.S. Pat. Nos. 3,046,127, 29,517,589), combination of triarylimidazole dimer and p-aminophenyl ketone (as described in U.S. Pat. No. 3,549,367), acridine and phenazine compounds (as described in JP-A 60-105667, U.S. Pat. No. 4,239,850), oxadiazole compounds (as described in U.S. Pat. No. 4,212,970), etc.

The amount of the photopolymerization initiator to be used is preferably from 0.1 to 20% by mass of the composition for infrared light reflective layer (or the solid content of the coating liquid of the composition), more preferably from 1 to 8% by mass.

(4) Fluorine-Containing Alignment Controlling Agent:

In the invention, a fluorine-containing alignment controlling agent that contributes toward stable or rapid formation of a cholesteric liquid crystal phase is added to the infrared light reflective layer composition in an amount of at least 60 ppm relative to the liquid crystal compound in the composition. Preferably, the fluorine-containing alignment controlling agent is a horizontal alignment agent. Examples of the fluorine-containing alignment controlling agent include fluorine-containing (meth)acrylate polymers, and compounds represented by the following general formulae (X1) to (X3). The composition may contain two or more selected from these. These compounds act to reduce the tilt angle of the molecules of the cholesteric liquid crystal compound in the air interface of the layer, or to align the molecules substantially horizontally. In this description, "horizontal alignment" means that the long axis of the liquid crystal molecule is parallel to the film surface, but does not require strict parallelism. In this description, "horizontal alignment" means that the tilt angle to the horizontal plane is less than 20 degrees. In case where the cholesteric liquid crystal compound is aligned horizontally in the vicinity of the air interface, alignment failure hardly occurs, and therefore the transparency of the reflector in a visible region may be high and the reflectance thereof in an infrared region may increase. On the other hand, when the molecules of the cholesteric liquid crystal compound are aligned at a large tilt angle, then the helical axis of the cholesteric liquid crystal phase may shift from the film face normal line, and therefore unfavorably, the reflectance may lower, and finger print patterns may form, the haze may increase and the reflector may have diffractivity.

Examples of the fluorine-containing (meth)acrylate polymers usable here as the fluorine-containing alignment controlling agent are described in JP-A 2007-272185, [0018] to [0043], etc.

As the fluorine-containing alignment controlling agent usable as a horizontal alignment agent, compounds of the following general formulae (X1) to (X3) are described below.

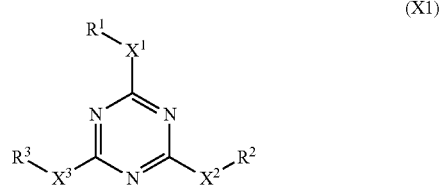

In the formula, $R^1$, $R^2$ and $R^3$ each independently represent a hydrogen atom or a substituent (containing at least one fluorine atom); $X^1$, $X^2$ and $X^3$ each independently represent a single bond or a divalent linking group. The substituent represented by $R^1$ to $R^3$ is preferably a substituted or unsubstituted alkyl group (more preferably an unsubstituted alkyl group or a fluorine-substituted alkyl group) or aryl group (more preferably an aryl group having a fluorine-substituted alkyl group), or a substituted or unsubstituted amino group, alkoxy group or alkylthio group, or a halogen atom. The divalent linking group represented by $X^1$, $X^2$ and $X^3$ is preferably a divalent linking group selected from an alkylene group, an alkenylene group, a divalent aromatic group, a divalent heterocyclic group, —CO—, —NRa— (where Ra represents an alkyl group having from 1 to 5 carbon atoms, or a hydrogen atom), —O—, —S—, —SO—, —SO$_2$— or their combinations. More preferably, the divalent linking group is a divalent linking group selected from an alkylene group, a phenylene group, —CO—, —NRa—, —O—, —S— and —SO$_2$—, or a divalent linking group formed by combining at least two of those groups. Preferably, the alkylene group has from 1 to 12 carbon atoms. Preferably, the alkenylene group has from 2 to 12 carbon atoms. Preferably, the divalent aromatic group has from 6 to 10 carbon atoms.

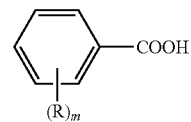

In the formula, R represents a substituent (containing at least one fluorine atom); m indicates an integer of from 0 to 5. In case where m is an integer of 2 or more, plural R's may be the same or different. Preferred substituents for R are the same as those mentioned above for preferred substituents for $R^1$, $R^2$ and $R^3$. m is preferably an integer of from 1 to 3, more preferably 2 or 3.

(X3)

$$\begin{array}{c} R^9O \quad OR^4 \\ \\ R^8O \quad\quad OR^5 \\ \\ R^7O \quad OR^6 \end{array}$$

In the formula, $R^4$, $R^5$, $R^6$, $R^7$, $R^8$ and $R^9$ each independently represent a hydrogen atom or a substituent (containing at least one fluorine atom). Preferred examples of the substituents for $R^4$, $R^5$, $R^6$, $R^7$, $R^8$ and $R^9$ are the same as those mentioned above for preferred substituents for $R^1$, $R^2$ and $R^3$ in the general formula (X1).

Examples of the compounds of the formulae (X1) to (X3) usable as the fluorine-containing alignment controlling agent in the invention include the compounds described in JP-A 2005-99248.

In the invention, one alone or two or more different types of the compounds of the formulae (X1) to (X3) may be used either singly or as combined.

Preferably in the infrared light reflector of the invention, the amount of the fluorine-containing alignment controlling agent is from 60 ppm to 1000 ppm relative to the cholesteric liquid crystal compound therein from the viewpoint of enhancing the alignability in the cholesteric liquid crystal layer, more preferably from 70 ppm to 900 ppm, even more preferably from 100 ppm (0.01% by mass) to 500 ppm.

In case where the type of the fluorine-containing alignment controlling agent is defined concretely, the amount of the compound of any of the general formulae (X1) to (X3) to be in the infrared light reflective layer composition may be the same as in the above-mentioned range.

Preferably, the blend ratio (by mass) of the polyfunctional polymerizable compound to be mentioned below and the above-mentioned, fluorine-containing alignment controlling agent in the infrared light reflective layer composition is from 50/1 to 1000/1, from the viewpoint of reducing the surface roughness Ra of the formed infrared light reflective layer, more preferably from 60/1 to 900/1, even more preferably from 70/1 to 500/1.

More preferably in the infrared light reflector of the invention, from the viewpoint that the amount of the fluorine-containing alignment controlling agent is controlled to fall within the above range, the fluorine-containing alignment controlling agent contains a perfluoroalkyl group, even more preferably a perfluoroalkyl group having from 3 to 10 carbon atoms.

(5) Polyfunctional Polymerizable Compound:

The infrared light reflector of the invention is characterized in that the infrared light reflective layer contains the above-mentioned polyfunctional polymerizable compound. The polyfunctional polymerizable compound may be contained in any other functional group than the infrared light reflective layer, and for example, it may be contained in the easy adhesion layer to be mentioned below.

In this description, "polyfunctional" compound means a compound containing at least two polymerizing groups responsible for polymerization.

The polyfunctional polymerizable compound may be a polyfunctional monomer or oligomer already polymerized in some degree. Above all, preferred is a polyfunctional monomer.

Not specifically defined, the polyfunctional polymerizable compound may be a liquid crystal compound or a non-liquid crystal compound. Above all, the polyfunctional polymerizable compound is preferably a non-liquid crystalline one from the viewpoint that its miscibility with the cholesteric liquid crystal phase is suppressed for facilitating eccentric location of the compound in the surface of the infrared light reflective layer or in the vicinity thereof.

Not specifically defined, the polymerizing group that the polyfunctional polymerizable compound has may be any known polymerizing group. For example, preferred are an unsaturated polymerizing group, an epoxy group and an aziridinyl group, more preferred is an unsaturated polymerizing group, and even more preferred is an ethylenic unsaturated polymerizing group. Of the ethylenic unsaturated polymerizing group, further preferred are those having a (meth)acryloyl group. In the infrared light reflector of the invention, more preferably, the polyfunctional polymerizable compound has at least two (meth)acryloyl groups, even more preferably two acryloyl groups. In this description, (meth)acryloyl group is a generic term of methacryloyl group and acryloyl group.

Preferably, the polyfunctional polymerizable compound contains at least one divalent aromatic group as the skeleton except the polymerizing group, more preferably a divalent aromatic group having from 6 to 30 carbon atoms. Preferably, the polyfunctional polymerizable compound is a non-liquid crystalline compound containing at least two divalent aromatic groups, more preferably two such groups, and even more preferably, in the compound, the two divalent aromatic groups are bonded via a linking group.

The linking group to bond the two divalent aromatic groups is, for example, a divalent linking group selected from a substituted or unsubstituted alkylene or alkenylene group, —CO—, —NRa— (Ra represents an alkyl group having from 1 to 5 carbon atoms, or a hydrogen atom), —O—, —S—, —SO—, —SO$_2$— and their combinations. Above all, preferred is a substituted or unsubstituted alkylene group having from 1 to 3 carbon atoms, and more preferred is a substituted alkylene group having from 1 to 3 carbon atoms.

As the substituent, preferred is an alkyl group having from 1 to 3 carbon atoms, and more preferred is a methyl group.

The polyfunctional polymerizable compound may have or may not have a linking group between the two polymerizing groups and the divalent aromatic group (the number of the groups is preferably 2); preferably, however, the compound has such a linking group therebetween from the viewpoint that the molecular weight of the compound can be controlled to fall within a preferred range. Above all, the linking group between the two polymerizing groups and the divalent aromatic group is preferably a linking group with which the polyfunctional polymerizable compound could be non-liquid crystalline; and for example, the linking group of the type includes an alkyleneoxy group (or oxyalkylene group), an alkylene group, an alkenylene group, —CO—, —NRa— (Ra represents an alkyl group having from 1 to 5 carbon atoms, or a hydrogen atom), —O—, —S—, —SO—, —SO$_2$— and their combinations. Above all, preferred is an alkyleneoxy group (or oxyalkylene group) having from 1 to 10 carbon atoms; more preferred is an alkyleneoxy group (or oxyalkylene group) having from 1 to 5 carbon atoms; and even more preferred is an alkyleneoxy group (or oxyalkylene group) having from 1 to 3 carbon atoms.

More preferably, the polyfunctional polymerizable compound has a structure represented by the following general formula (1):

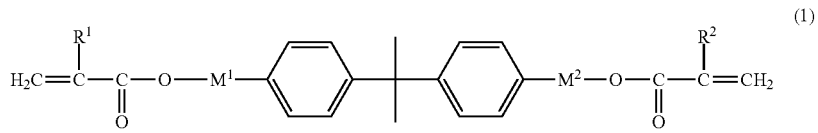

In the general formula (1), $R^1$ and $R^2$ each independently represent a hydrogen atom or a methyl group; $M^1$ and $M^2$ each independently represent —(CH$_2$—CH$_2$—O)$_n$—, —(O—CH$_2$—CH$_2$)$_n$—, —(CH$_2$—CH$_2$—CH$_2$—O)$_m$—, —(O—CH$_2$—CH$_2$—CH$_2$)$_m$—, —(CH$_2$)$_p$— or their combination; n, m and p each independently indicate an integer of from 1 to 50.

Preferably, $R^1$ and $R^2$ are hydrogen atoms.

Preferably, $M^1$ and $M^2$ each are —(CH$_2$—CH$_2$—O)$_m$—(O—CH$_2$—CH$_2$)$_m$—, —(CH$_2$—CH$_2$—CH$_2$—O)$_m$—, —(O—CH$_2$—CH$_2$—CH$_2$)$_m$— or —(CH$_2$)$_p$—. Of those more preferably, $M^1$ is —(CH$_2$—CH$_2$—O)$_n$— or —(CH$_2$—CH$_2$—CH$_2$—O)$_m$—, even more preferably —(CH$_2$—CH$_2$—O)$_n$—. On the other hand, $M^2$ is preferably —(O—CH$_2$—CH$_2$)$_n$— or —(O—CH$_2$—CH$_2$—CH$_2$)$_m$—, more preferably —(O—CH$_2$—CH$_2$)$_n$—.

Preferably, n is from 1 to 30, more preferably from 2 to 20, even more preferably from 2 to 18.

Preferably, m is from 0 to 15, more preferably from 0 to 5, even more preferably 0.

Preferably, p is from 0 to 30, more preferably from 0 to 10, even more preferably 0.

Preferably, in the infrared light reflector of the invention, the molecular weight of the polyfunctional polymerizable compound is from 350 to 2000, more preferably from 400 to 1700, even more preferably from 500 to 1300.

<Substrate>

It is preferable that the infrared light reflector of the invention has a substrate. However, the substrate is not limited at all with respect to a material and optical characteristics so far as it is self-supporting and is able to support the light reflective layer. The substrate will be required to have high transparency against an ultraviolet light depending upon an application. The substrate may be a special retardation plate such as a λ/2 plate, which is manufactured by controlling the manufacturing process so as to satisfy prescribed optical characteristics, or may be a polymer film which has a large scattering of in-plane retardation, specifically when expressed in terms of a scattering in-plane retardation Re (1000) at a wavelength of 1,000 nm, the scattering of Re (1000) is 20 nm or more, or 100 nm or more, and which cannot be used as a prescribed retardation plate, or the like. Also, the in-plane retardation is not particularly limited, and for example, a retardation plate having an in-plane retardation Re (1000) at a wavelength of 1,000 nm of from 800 to 13,000 nm, or the like can be used. Also, the substrate may be a glass.

Examples of the polymer film having high transmission properties against a visible light include various polymer films for optical film, which are used as a member of a display device of a liquid crystal display device. Examples of the substrate include a polyester film such as polyethylene terephthalate (PET), polybutylene terephthalate and polyethylene naphthalate (PEN); a polycarbonate (PC) film; a polymethyl methacrylate film; a polyolefin film such as polyethylene and polypropylene; a polyimide film; and a triacetyl cellulose (TAC) film. Of these, polyethylene terephthalate or triacetyl cellulose is preferable.

The infrared light reflector of the invention may be integrated with any other supporting member such as laminated glass or the like. In such a case, the substrate may also be integrated with the other supporting member along with the light reflective layer; or the substrate may be peeled off and the light reflective layer may be integrated with the supporting member.

3. Easy Adhesion Layer:

Preferably, in the infrared light reflector of the invention, the infrared light reflective layer includes an easy adhesion layer. The infrared light reflector of the invention is characterized in that when a functional layer composition is applied onto at least one surface of the infrared light reflective layer, the number of the coating liquid cissing defects having a diameter of at least 5 μm is at most 10/m², and the functional layer composition is preferably an easy adhesion layer coating liquid.

The infrared light reflector of the invention may have the easy adhesion layer as one or both outermost layers thereof. For example, the easy adhesion layer has the function of enhancing the adhesiveness between the light reflective layer and the interlayer sheet of laminated glass, glass sheet, adhesive layer to be stuck to glass, etc. The material usable for forming the easy adhesion layer includes a polyvinyl butyral (PVB) resin. The polyvinyl butyral resin is a type of polyvinyl acetal to be produced by reacting polyvinyl alcohol (PVA) and butylaldehyde in the presence of an acid catalyst, and is a resin having a recurring unit of the following structure.

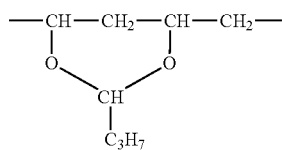

The easy adhesion layer may be a layer formed of an acrylic resin, a styrene/acrylic resin, an urethane resin, a polyester resin or the like. The easy adhesion layer formed of such a material may also be formed by coating. Further, a UV absorbent, an antistatic agent, a lubricant, an antiblocking agent or the like may be added to the easy adhesion layer.

The thickness of the easy adhesion layer is preferably from 0.1 to 10 μm.

4. Undercoat Layer:

The infrared light reflector of the invention may have an undercoat layer between the infrared light reflective layer and the substrate. When the adhesion force between the infrared light reflective layer and the substrate is low, then peeling trouble may occur in the process of forming the infrared light reflective layers by lamination or the strength (impact resistance) of the infrared light reflector stuck to glass may lower. Accordingly, an undercoat layer may be provided for the purpose of enhancing the adhesiveness between the infrared light reflective layer and the substrate. The interface between the substrate and the undercoat layer, and that between the undercoat layer and the infrared light reflective layer require adhesiveness to such a degree that the two do not peel off. On the other hand, however, in an embodiment where the infrared light reflector is produced by peeling the infrared light reflective layer from the resin substrate and simultaneously transferring the thus-peeled layer onto a different resin substrate, low adhesiveness is needed in any interface of infrared light reflective layer/undercoat layer/resin substrate to such a degree that they could be peeled off via the interface.

Examples of the material usable in forming the undercoat layer include acrylate copolymers, polyvinylidene chloride, styrene-butadiene rubber (SBR), aqueous polyesters, etc. In an embodiment where the surface of the undercoat layer is stuck to an interlayer film, preferably, the adhesiveness between the undercoat layer and the interlayer film is good; and from this viewpoint, preferably, the undercoat layer contains a polyvinyl butyral resin along with the above-mentioned material. In addition, since the adhesion force of the undercoat layer must be controlled suitably, it is also preferable that the layer is suitably hardened with a hardener, for example, selected from dialdehydes such as glutaraldehyde, 2,3-dihydroxy-1,4-dioxane and the like, or boric acid. The amount of the hardener to be added is preferably from 0.2 to 3.0% by mass of the dry mass of the undercoat layer.

Preferably, the thickness of the undercoat layer is from 0.05 to 0.5 μm.

5. Alignment Layer:

The infrared light reflector of the invention may have an alignment layer between the infrared light reflective layer and the substrate. The alignment layer has the function of accurately defining the alignment direction of the cholesteric liquid crystal compound in the infrared light reflective layer.

The alignment layer must be adjacent to the infrared light reflective layer, and preferably, therefore, the layer is arranged between the infrared light reflective layer with a cholesteric liquid crystal phase and a substrate or an undercoat layer. However, the undercoat layer may serve also as the alignment layer. In addition, the alignment layer may be arranged between the light reflective layers.

Preferably, the alignment layer has adhesion force in some degree to any of the neighboring infrared light reflective layer and undercoat layer or substrate. However, the adhesion force must be to such a degree that peeling does not occur in any interface of infrared light reflective layer/alignment layer/undercoat layer/substrate. On the other hand, however, in an embodiment where the infrared light reflector is produced by peeling the infrared light reflective layer from the resin substrate and simultaneously transferring the thus-peeled layer onto a different resin substrate, low adhesiveness is needed in any interface of infrared light reflective layer/alignment layer/undercoat layer/resin substrate to such a degree that they could be peeled off via the interface.

As the material for use for the alignment layer, preferred is a polymer of an organic compound, and well used is a self-crosslinkable polymer or a polymer capable of being crosslinked with a crosslinking agent. Naturally, polymers having both the two functions are also usable here. Examples of the polymers include polymethyl methacrylate, acrylic acid/methacrylic acid copolymer, styrene/maleimide copolymer, polyvinyl alcohol and modified polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene, polycarbonate and other polymers, as well as compounds of silane coupling agents, etc. Preferred examples of the polymers are water-soluble polymers such as poly(N-methylolacrylamide), carboxymethyl cellulose, gelatin, polyvinyl alcohol and modified polyvinyl alcohol, etc.; more preferred are gelatin, polyvinyl alcohol and modified polyvinyl alcohol; and even more preferred are polyvinyl alcohol and modified polyvinyl alcohol. In an embodiment where the surface of the alignment layer is adhered to an interlayer film, preferably, the adhesiveness between the alignment layer and the interlayer film is high; and from this viewpoint, preferably, the alignment layer contains a polyvinyl butyral resin along with the above-mentioned material.

Preferably, the thickness of the alignment layer is from 0.1 to 2.0 µm.

6. Back Layer:

The infrared light reflector of the invention may have a back layer on the side of the substrate on which the infrared light reflective layer is not formed.

For the back layer, for example, a layer having the same configuration as that of the above-mentioned easy adhesion layer may be formed.

Preferably, the thickness of the back layer is from 0.1 to 2.0 µm.

<Production Method for Infrared Light Reflector>

The infrared light reflector of the invention may be produced according to a coating method. One example of the production method comprises:

(1) applying an infrared light reflective layer composition that contains a polyfunctional polymerizable compound, a polymerizable (curable) cholesteric liquid crystal compound, and a fluorine-containing alignment controlling agent (horizontal alignment agent) in an amount of at least 60 ppm relative to the liquid crystal compound, onto the surface of a resin substrate and providing a cholesteric liquid crystal phase state thereon, (2) irradiating the infrared light reflective layer composition with UV rays to promote the curing reaction to thereby fix the cholesteric liquid crystal phase to form a light reflective layer.

The steps (1) and (2) are repeated four times on one surface of the substrate, thereby producing an infrared light reflector having the same configuration as that shown in FIG. 1.

<Formation of Undercoat Layer, Alignment Layer, Back Layer>

Preferably, the undercoat layer is formed by coating on the surface of the substrate on which the infrared light reflective layer is to be formed. The coating method is not specifically defined, for which any known method is employable.

The alignment layer may be provided according to a means of rubbing treatment of an organic compound (preferably polymer), or oblique evaporation of an inorganic compound, or formation of a microgroove-having layer, or the like. Further, there is known an alignment layer capable of exhibiting the alignment function thereof through electric field impartation, magnetic field impartation or photoirradiation. Preferably, the alignment layer is formed through rubbing treatment of the surface of a polymer film. Preferably, the alignment film is formed on the surface of the substrate on which the infrared light reflective layer is to be formed.

Preferably, the back layer is formed by coating on the surface of the substrate opposite to the surface thereof on which the infrared light reflective layer is to be formed. The coating method is not specifically defined, for which any known method is employable.

<Step (1)>

In the step (1), first the above-mentioned infrared light reflective layer composition is applied on the surface of the substrate or the underlying light reflective layer. Preferably, the infrared light reflective layer composition is prepared as a coating liquid of the materials dissolved and/or dispersed in a solvent. For coating with the coating liquid, employable are various methods of a wire bar coating method, an extrusion coating method, a direct gravure coating method, a reverse gravure coating method, a die coating method, etc. As the case may be, an inkjet apparatus may be used, in which the infrared light reflective layer composition may be jetted out through the nozzle to form a coating film.

The type of the solvent is not specifically defined so far as the solvent can dissolve or disperse the cholesteric liquid crystal compound. For example, as the main solvent, usable are ketone solvents, ester solvents, alcohol solvents, etc. Concretely, preferred for use herein are methyl ethyl ketone (MEK), methyl isobutyl ketone (MIRK), cyclohexanone, methoxyethyl acetate, methoxypropyl acetate (PGMEA), ethoxypropyl acetate, ethanol, isopropanol (IPA), etc. Above all, in the invention, preferred is use of a ketone solvent as the main solvent for the coating liquid of the infrared light reflective layer composition. Regarding the solvent of the type, there has occurred a problem of coating liquid cissing failure when a specific amount of the fluorine-containing alignment controlling agent is contained in the infrared light reflective layer; however, according to the constitution of the invention, the problem can be solved in forming the infrared light reflective layer by the use of the solvent. As the other solvent than the main solvent, also usable is an ester solvent or an alcohol solvent not falling within the scope of the ketone solvent, along with the main solvent. In this description, the main solvent means the solvent of which the ratio by volume is the largest of the entire solvent composition.

For the infrared light reflector of the invention, the viscosity of the infrared light reflective layer composition is preferably from 0.1 to 10 mPa·s, more preferably from 1 to 8 mPa·s, even more preferably from 2 to 5 mPa·s.

Next, preferably, the infrared light reflective layer composition applied on the surface and formed into a coating film is processed to have a cholesteric liquid crystal phase state therein. In an embodiment where the infrared light reflective layer composition is formed as a coating liquid that contains a solvent, the coating film is dried and the solvent is removed whereby the intended cholesteric liquid crystal phase state can be formed. In order that the coating film could be at a transition temperature at which the phase is converted into a cholesteric liquid crystal phase, if desired, the coating film may be heated. For example, the coating film is once heated up to a temperature of an isotropic phase, and thereafter cooled to a cholesteric liquid crystal phase transition temperature, whereby the intended cholesteric liquid crystal phase can be stably formed. The liquid crystal phase transition temperature of the infrared light reflective layer composition is preferably within a range of from 10 to 250° C. from the viewpoint of the production aptitude, more preferably within a range of from 10 to 150° C. When the temperature is lower than 10° C., a cooling step may be needed for lowering the temperature to the temperature range within which the film can exhibit a liquid crystal phase. When higher than 200° C., a high temperature may be needed for heating the film that is once in a liquid crystal phase to a further higher temperature range within which the composition may be in an isotropic liquid state; and this is disadvantageous from the viewpoint of waste of heat energy and deformation and degradation of substrate, etc.

<Step (2)>

Next, in the step (2), the coating film that has been in a cholesteric liquid crystal phase state is irradiated with UV rays to thereby promote the curing reaction. For UV irradiation, usable is a light source of UV lamp, etc. In this step, the UV irradiation promotes the curing reaction of the liquid crystal composition whereby the cholesteric liquid crystal phase is fixed and the intended light reflective layer is formed.

The UV irradiation energy dose is not specifically defined. In general, the dose is preferably from 100 mJ/cm$^2$ to 800 mJ/cm$^2$ or so. The time for which the coating film is irradiated with UV rays is not also specifically defined. The time may be determined from the viewpoint of both the sufficient strength and the producibility of the cured film.

The degree of eccentric location of the polyfunctional polymerizable compound in the surface of the infrared light reflective layer or in the vicinity thereof is not also specifically defined since the curing reaction in the invention can be sufficiently attained under the above-mentioned UV irradiation condition though the degree may be somewhat influenced by the condition of the curing reaction.

For promoting the curing reaction, the UV irradiation may be attained under heat. Preferably, the temperature during the UV irradiation is so controlled as to fall within a temperature range within which the cholesteric liquid crystal liquid crystal phase is not disordered but can be kept well as such. The oxygen concentration in the atmosphere may have some influence on the degree of polymerization, and therefore, in case where the desired degree of polymerization could not be attained in air and the film strength is insufficient, it is desirable that the oxygen concentration in the atmosphere is lowered according to a method of nitrogen purging or the like. The preferred oxygen concentration is at most 10%, more preferably at most 7%, most preferably at most 3%. The reactivity of the curing reaction (for example, polymerization reaction) to be promoted by the UV irradiation is preferably at least 70%, from the viewpoint of securing the mechanical strength of the layer and preventing any unreacted substance from flowing away from the layer, more preferably at least 80%, even more preferably at least 90%. For increasing the reactivity, effectively employed is a method of increasing the UV irradiation dose or a method of attaining the polymerization in a nitrogen atmosphere or under heat. Also employable is a method of heating the film after polymerization, at a temperature higher than the polymerization temperature to further promote the thermal polymerization, or a method of again irradiating the film with UV ray (provided that the re-irradiation is attained under the condition that satisfies the condition of the invention). The reactivity may be determined by measuring the absorption intensity of the IR vibrational spectrum of the reactive group (for example, polymerizing polymerizable group) before and after the reaction and comparing the found data.

In the above-mentioned step, the cholesteric liquid crystal phase is fixed and the intended light reflective layer is thereby formed. In this, for the "fixed" state of the liquid crystal phase, a state where the alignment of the liquid crystal compound in a cholesteric liquid crystal phase is held is the most typical and preferred embodiment. However, the state is not limited thereto. Concretely, the state means that, in a temperature range of generally from 0° C. to 50° C., or under a severe condition, from −30° C. to 70° C., the layer has no flowability and undergoes no change in the alignment state by any external field or external force given thereto, and can stably maintain the fixed alignment state therein. In the invention, by the curing reaction that is promoted by UV irradiation, the alignment state of the cholesteric liquid crystal phase is fixed.

In the invention, it is enough that the optical properties of the cholesteric liquid crystal phase are held in the layer, and it is not necessary that the liquid crystal composition in the light reflective layer would finally exhibit liquid crystallinity. For example, it may be good that the liquid crystal composition has been cured to have an increased high molecular weight and has already lost the liquid crystallinity.

(Formation of Easy Adhesion Layer)

Preferably, the easy adhesion layer is formed by coating. For example, the layer may be formed on the surface of the infrared light reflective layer by coating thereon. More concretely, a type of polyvinyl butyral resin is dissolved in an organic solvent to prepare a coating liquid, and the coating liquid is applied on the surface of the infrared light reflective layer and/or the back of the substrate, and then optionally heated and dried to form the easy adhesion layer. The solvent to be used in preparing the coating liquid for the easy adhesion layer is, for example, as the main solvent, a ketone solvent, an ester solvent, an alcohol solvent or the like. Concretely, preferred for use herein are methyl ethyl ketone (MEK), methyl isobutyl ketone (MIBK), cyclohexanone, methoxyethyl acetate, methoxypropyl acetate (PGMEA), ethoxypropyl acetate, ethanol, isopropanol (IPA), etc. Above all, in the invention, preferred is use of a ketone solvent as the main solvent for the coating liquid of the easy adhesion layer. Regarding the solvent of the type, there has occurred a problem of coating liquid cissing failure when a specific amount of the fluorine-containing alignment controlling agent is contained in the infrared light reflective layer; however, according to the constitution of the invention, the problem can be solved in forming the easy adhesion layer by the use of the solvent. As the other solvent than the main solvent, also usable is an ester solvent or an alcohol solvent not falling within the scope of the ketone solvent, along with the main solvent. As the coating method, employable are various methods heretofore known in the art. The preferred range of the temperature in drying may vary depending on the materials used in preparing the coating liquid; but in general, the drying temperature is preferably from 140 to 160° C. or so. The drying time is not also specifically defined, but is, in general, preferably from 5 to 10 minutes or so.

<Use of Infrared Light Reflector>

The infrared light reflector of the invention is excellent in heat shieldability and preferably exhibits selective reflectivity at reflection peaks of from 1010 to 1070 nm and from 1190 to 1290 nm corresponding to the peaks of sunlight energy. In addition, the infrared light reflector of the invention is excellent in re-peelability, and in re-peeling from glass, there hardly occurs a problem of interlayer peeling. The reflector having such characteristics can be stuck to windowpanes of building structures such as residential houses, office buildings, etc. and to those of cars, etc., as a solar radiation heat-shielding member. Preferably, the infrared light reflector of the invention is stuck to glass windowpanes. In addition, the infrared light reflector of the invention may be used as a solar radiation heat-shielding member of itself (for example, as a heat-shielding glass or a heat-shielding film), directly as it is.

Other important properties of the infrared light reflector are visible light transmittance and haze. By suitably selecting the materials and controlling the production condition, the infrared light reflector may be made to have visible light transmittance and haze both on a preferred level depending on the use thereof. For example, in an embodiment where the infrared light reflector is used for high visible light transmittance, the reflector may be made to have a visible light transmittance of at least 90% and have an infrared reflectance that satisfies the above-mentioned conditions.

EXAMPLES

The characteristics of the invention are described more concretely hereinunder with reference to Examples and Comparative Examples. (Comparative Examples are not always examples of known arts.) In the following Examples, the material used, its amount and ratio, the details of the treatment and the treatment process may be suitably modified or changed not overstepping the spirit and the scope of the invention. Accordingly, the scope of the invention should not be limitatively interpreted by the Examples mentioned below.

[Preparation of Back Layer Coating Liquid]

A back layer coating liquid (U) having the composition mentioned below was prepared.

| Composition of Back Layer Coating Liquid (U): | |
|---|---|
| Styrene-acrylic resin Aron S-1001 (by Toa Gosei, having a solid concentration of 50%) | 20 parts by mass |
| Methoxypropyl acetate (PGMEA) | 80 parts by mass |

[Preparation of Underlayer Coating Liquid]

An underlayer coating liquid (S) having the composition mentioned below was prepared.

| Composition of Underlayer Coating Liquid (S): | |
|---|---|
| Acrylic ester resin Jurymer ET-410 (by Toa Gosei, having a solid concentration of 30%) | 50 parts by mass |
| Methanol | 50 parts by mass |

[Preparation of Alignment Layer Coating Liquid]

An alignment layer coating liquid (H) having the composition mentioned below was prepared.

| Composition of Alignment Layer Coating Liquid (H): | |
|---|---|
| Modified polyvinyl alcohol PVA 203 (by Kuraray) | 10 parts by mass |
| Glutaraldehyde | 0.5 parts by mass |
| Water | 371 parts by mass |
| Methanol | 119 parts by mass |

[Preparation of Easy Adhesion Layer Coating Liquid]

An easy adhesion layer coating liquid (I) having the composition mentioned below was prepared.

| Composition of Easy Adhesion Layer Coating Liquid (I): | |
|---|---|
| Polyvinyl butyral resin B1776 (by Changchun Co., Taiwan) | 10 parts by mass |
| Methoxypropyl acetate (PGMEA) | 100 parts by mass |

[Preparation of Liquid Crystal Composition Coating Liquid]

Liquid crystal composition coating liquids (R11) and (L11) each having the composition mentioned below were prepared. The viscosity at 23° C. of the coating liquids was 3.7 mPa·s and 4.1 mPa·s, respectively.

TABLE 1

Composition of Coating Liquid (R11)

| Material (type) | Name of Material (manufacturer) | Amount |
|---|---|---|
| Rod-shaped liquid crystal compound | RM-257 (Merck) | 9.500 parts by mass |
| Polyfunctional polymerizable compound | polymerizable compound (1) | 0.500 parts by mass |
| Chiral agent | LC-756 (BASF) | 0.268 parts by mass |
| Polymerization initiator | Irgacure 819 (Ciba Specialty Chemicals) | 0.400 parts by mass |
| Alignment controlling agent | compound 1 shown below | 0.003 parts by mass |
| Solvent | 2-butanone (by Wako Pure Chemicals) | 15.700 parts by mass |

TABLE 2

Composition of Coating Liquid (L11)

| Material (type) | Name of Material (manufacturer) | Amount |
|---|---|---|
| Rod-shaped liquid crystal compound | RM-257 (Merck) | 9.500 parts by mass |
| Polyfunctional polymerizable compound | polymerizable compound (1) | 0.500 parts by mass |
| Chiral agent | compound 2 shown below | 0.167 parts by mass |
| Polymerization initiator | Irgacure 819 (Ciba Specialty Chemicals) | 0.400 parts by mass |
| Alignment controlling agent | compound 1 shown below | 0.003 parts by mass |
| Solvent | 2-butanone (by Wako Pure Chemicals) | 15.700 parts by mass |

Polymerizable Compound (1)

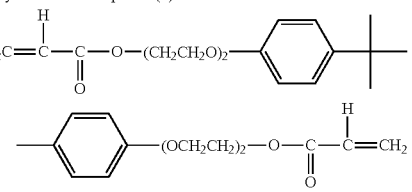

Fluorine-Containing Alignment Controlling Agent: compound 1 (compound described in JP-A 2005-99248)

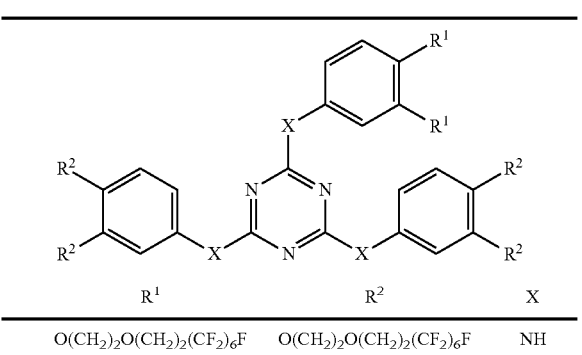

Chiral Agent: compound 2 (compound described in JP-A2002-179668)

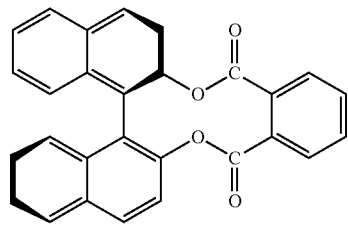

A coating liquid (R12) was prepared in the same manner as that for the coating liquid (R11), except that the amount of the chiral agent LC-756 was changed from 0.268 parts by mass to 0.225 parts by mass. The viscosity at 23° C. of the coating liquid was 3.7 mPa·s.

A coating liquid (L12) was prepared in the same manner as that for the coating liquid (L11), except that the amount of the chiral agent, compound 2 was changed from 0.167 parts by mass to 0.140 parts by mass. The viscosity at 23° C. of the coating liquid was 4.0 mPa·s.

Example 1

Using a wire bar, the back layer coating liquid (U) was applied onto a PET film (by FUJIFILM, having a thickness of 188 μm) so that the thickness of the coating layer after dried could be 0.5 μm. Subsequently, this was heated at 150° C. for 10 minutes, dried and solidified to form a back layer.

Next, using a wire bar, the underlayer coating liquid (S) was applied to the surface of the back layer-having PET film, as prepared in the above, on the side thereof not having the back layer so that the thickness of the coating layer after dried could be 0.25 μm. Subsequently, this was heated at 150° C. for 10 minutes, dried and solidified to form an undercoat layer.

Next, using a wire bar, the alignment layer coating liquid (H) was applied onto the formed undercoat layer so that the thickness of the coating layer after dried could be 1.0 μm. Subsequently, this was heated at 100° C. for 2 minutes, dried and solidified to form an alignment layer. The alignment layer was rubbed (with rayon cloth, under pressure of 0.1 kgf, at rotation of 1000 rpm, at conveying speed of 10 m/min, for one reciprocation).

Next, using the liquid crystal composition coating liquids (R11), (R12), (L11) and (L12), infrared light reflective layers were formed on the formed alignment layer, according to the process mentioned below.

(1) Using a wire bar, each coating liquid was applied onto the alignment layer at room temperature so that the thickness of the coating layer after dried could be 5 μm.

(2) This was dried at room temperature for 30 seconds to remove the solvent, and then heated at 125° C. for 2 minutes, and thereafter processed as 95° C. to form a cholesteric liquid crystal phase. Next, using an electrodeless lamp, Fusion UV Systems' "D Bulb" (90 mW/cm), this was irradiated with UV rays at an output of 60% for 6 to 12 seconds to fix the cholesteric liquid crystal phase, thereby forming an infrared light reflective layer.

(3) After this was cooled to room temperature, the above steps (1) and (2) were repeated, thereby forming four laminated, cholesteric liquid crystal phase-having infrared light reflective layers.

The coating liquids (R11), (R12), (L11) and (L12) were applied in that order.

Regarding the selective reflection wavelength of the infrared light reflective layers of the coating liquids (R11) and (L11), the center wavelength was 1040 nm and the reflection width was 100 nm. Regarding the selective reflection wavelength of the infrared light reflective layers of the coating liquids (R12) and (L12), the center wavelength was 1240 nm and the reflection width was 120 nm.

Next, using a wire bar, the easy adhesion layer coating liquid (I) was applied onto the formed infrared light reflective layer so that the thickness of the coating layer after dried could be 1.0 μm. Subsequently, this was heated at 150° C. for 10 minutes, dried and solidified to form an easy adhesion layer, thereby producing an infrared light reflector.

Comparative Example 1

Coating liquids (R1), (R2), (L1) and (L2) were prepared in the same manner as that for the liquid crystal composition coating liquids (R11), (R12), (L11) and (L12), except that the amount of the polyfunctional polymerizable compound (polymerizable compound (1)) is 0 (zero) and the amount of the rod-shaped liquid crystal compound RM-257 was changed to 10.000 parts by mass. The viscosity at 23° C. of the coating liquids was 2.3 mPa·s, 2.3 mPa·s, 2.6 mPa·s and 2.5 mPa·s, respectively.

An infrared light reflector of Comparative Example 1 was produced according to the same process as in Example 1, except that the liquid crystal composition coating liquids (R1), (R2), (L1) and (L2) were used in place of (R11), (R12), (L11) and (L12).

[Check of Cissing Failure]

Within a range of an area of 1 m², the coating layer is visually checked for the presence of absence of cissing defects. The cissing defects, if any, are analyzed for the size thereof with an optical microscope as to whether the longer diameter could be 5 μm or more. The number of the defects having a size of at least 5 μm is counted.

[Measurement of Contact Angle (to Pure Water)]

The contact angle (to pure water) on the surface of the infrared light reflective layer is measured according to JIS R 3257 "Test Method for Wettability of Substrate Glass Surface".

Within a range of an area of 1 m², four edges (each inside by 10% of the width in the longitudinal direction and in the lateral direction) and the center, totaling 5 points, are analyzed, and the found data are averaged to give a mean value.
[Computation of Surface Energy Value (Mean Value, and Standard Deviation of Fluctuation)]

The contact angle (to methylene chloride) on the surface of the infrared light reflective layer is measured according to JIS R 3257 "Test Method for Wettability of Substrate Glass Surface". Like in the method of measurement of the contact angle to pure water, five points are analyzed.

At each point, the surface energy value is computed according to the Owens and Wendt method using the contact angle to pure water and the contact angle to methylene chloride. The mean value of the surface energy of the five points and the standard deviation of fluctuation thereof are computed.
[Measurement of Surface Roughness (Arithmetic Mean Roughness) Ra]

The surface of the coating layer is analyzed for the surface roughness thereof, according to JIS B 0601 "Geometrical Product Specifications (GPS)—Surface Texture: Profile Method—Terms, Definitions and Surface Texture Parameters".
[Measurement of Film Strength (Elongation at Rupture, Stress at Rupture)]

Each of the produced infrared light reflectors is analyzed for the elongation at rupture and the stress at rupture thereof, according to JIS K 7162 "Plastics—Determination of Tensile Properties—Part 2: Test Conditions for Molding and Extrusion Plastics".
[Evaluation of Film Brittleness]

Each of the produced infrared light reflectors is analyzed for the brittleness thereof, according to JIS K 5600-5-1 "Testing Methods for Paints—Part 5: Mechanical Property of Film—Section 1: Bend Test (cylindrical mandrel)". The reflector is bend so that its side having the infrared light reflective layer could face outside. The test is started from the sample having a larger cylindrical diameter, and the cylindrical diameter of the sample is gradually reduced. The test is continued until the result is "no good". In the evaluation column, shown is the size one size smaller of the cylindrical diameter given a result of "no good". For the evaluation of bending resistance (cylindrical mandrel), 9 or less is preferred for practical use; and 7 or less is more preferred.
[Evaluation of Heat Shieldability]

Each of the produced infrared light reflectors is analyzed for the reflection spectrum thereof, using a spectrophotometer, JASCO's "V-670", and the heat shieldability (reflectance) thereof to the solar spectrum falling within a wavelength range of from 780 to 1400 nm is computed. The heat shieldability is evaluated based on the standards mentioned below (higher reflectance is preferred).

A: Reflectance, at least 30%.
B: Reflectance, from 25% to less than 30%.
C: Reflectance, less than 25%.

The evaluation results are shown in Tables 3 and 4 below.

TABLE 3

Surface Properties of Infrared Light reflective Layer, and Cissing Defects and Surface Roughness I of Functional Layer Formed on the Layer

| | Infrared Light reflective Layer | Type of Coating Liquid Viscosity of Coating Liquid [mPa·s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 1 | coating liquid (R11) polymerizing compound (1): 0.500 parts by mass alignment controlling agent: 0.003 parts by mass | coating liquid (L11) 4.1 | 91.1 | 44.2 | 37.4 (σ = 0.1) | 0 | 30 |
| | coating liquid (L11) polymerizing compound (1): 0.500 parts by mass alignment controlling agent: 0.003 parts by mass | coating liquid (R12) 3.7 | 91.2 | 44.0 | 37.5 (σ = 0.1) | 0 | 30 |
| | coating liquid (R12) polymerizing compound (1): 0.500 parts by mass alignment controlling agent: 0.003 parts by mass | coating liquid (L12) 4 | 91.4 | 43.8 | 37.6 (σ = 0.1) | 1 | 32 |
| | coating liquid (L12) polymerizing compound (1): 0.500 parts by mass alignment controlling agent: 0.003 parts by mass | easy adhesion layer coating liquid (I) | 91.7 | 43.5 | 37.8 (σ = 0.1) | 3 | 35 |
| Comparative Example 1 | coating liquid (R1) polymerizing compound (1): 0.000 parts by mass alignment controlling agent: 0.003 parts by mass | coating liquid (L1) 2.3 | 96.3 | 39.1 | 40.5 (σ = 0.1) | 2 | 45 |
| | coating liquid (L1) polymerizing compound (1): 0.000 parts by mass alignment controlling agent: 0.003 parts by mass | coating liquid (R2) 2.6 | 96.5 | 38.9 | 40.6 (σ = 0.2) | 11 | 62 |
| | coating liquid (R2) polymerizing compound (1): 0.000 parts by mass alignment controlling agent: 0.003 parts by mass | coating liquid (L2) 2.5 | 96.8 | 38.8 | 40.7 (σ = 0.4) | 72 | 75 |
| | coating liquid (L2) polymerizing compound (1): 0.000 parts by mass alignment controlling agent: 0.003 parts by mass | easy adhesion layer coating liquid (I) | 97.2 | 38.4 | 41.0 (σ = 0.7) | 314 | 87 |

TABLE 4

Infrared Light Reflector Performance Evaluation Results I

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 1 | 7.1 | 25 | 6 | 30.5 |
| Comparative Example 1 | 2.3 | 18 | 10 | 30.8 |

As shown in the above Tables, in Example 1 containing the polymerizable compound (1), the cissing failure was prevented in coating the infrared light reflective layer with the functional layer composition (infrared light reflective layer coating liquid, easy adhesion layer coating liquid). The surface energy value of each infrared light reflective layer was lower than 40 mN/m and the surface roughness of the coating layer was reduced. While the heat shieldability of the infrared light reflector of Example 1 was comparable to that of Comparative Example 1, the film strength of the former was enhanced and the film brittleness thereof was reduced.

In Comparative Example 1 not containing the polymerizable compound (1), there occurred the problem of cissing failure in coating the infrared light reflective layer with the functional layer composition (infrared light reflective layer coating liquid, easy adhesion layer coating liquid). The surface energy value of each infrared light reflective layer was higher than 40 mN/m and the fluctuation thereof was large. With the increase in the lamination frequency, the number of cissing defects increased. With the increase in the lamination frequency, the surface roughness Ra of the coating layer also increased. The film strength of the infrared light reflector was low, and the film brittleness thereof was high.

In Example 2 to Example 5, the molecular weight dependence of the polyfunctional polymerizable compound for use herein was investigated.

Example 2

Liquid crystal composition coating liquids (R21), (R22), (L21) and (L22) were prepared in the same manner as that for the liquid crystal composition coating liquids (R11), (R12), (L11) and (L12), except that the polyfunctional polymerizable compound (1) (molecular weight: 513) was changed to the following polyfunctional polymerizable compound (2) (molecular weight: 336). The viscosity at 23° C. of the coating liquids was 2.9 mPa·s, 2.9 mPa·s, 3.2 mPa·s and 3.1 mPa·s, respectively.

Polymerizable Compound (2):

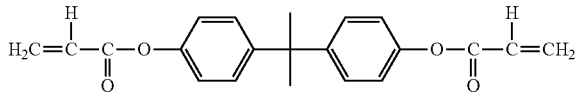 [SMILES: C=CC(=O)Oc1ccc(C(C)(C)c2ccc(OC(=O)C=C)cc2)cc1]

An infrared light reflector of Example 2 was produced according to the same process as in Example 1, except that the liquid crystal composition coating liquids (R21), (R22), (L21) and (L22) were used in place of (R11), (R12), (L11) and (L12).

Example 3

Liquid crystal composition coating liquids (R31), (R32), (L31) and (L32) were prepared in the same manner as that for the liquid crystal composition coating liquids (R11), (R12), (L11) and (L12), except that the polyfunctional polymerizable compound (1) was changed to the following polyfunctional polymerizable compound (3) (molecular weight: 424). The viscosity at 23° C. of the coating liquids was 3.6 mPa·s, 3.5 mPa·s, 3.9 mPa·s and 3.8 mPa·s, respectively.

Polymerizable Compound (3):

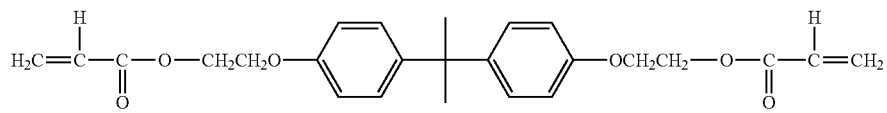

An infrared light reflector of Example 3 was produced according to the same process as in Example 1, except that the liquid crystal composition coating liquids (R31), (R32), (L31) and (L32) were used in place of (R11), (R12), (L11) and (L12).

Example 4

Liquid crystal composition coating liquids (R41), (R42), (L41) and (L42) were prepared in the same manner as that for the liquid crystal composition coating liquids (R11), (R12), (L11) and (L12), except that the polyfunctional polymerizable compound (1) was changed to the following polyfunctional polymerizable compound (4) (molecular weight: 1656). The viscosity at 23° C. of the coating liquids was 5.8 mPa·s, 5.7 mPa·s, 6.9 mPa·s and 6.6 mPa·s, respectively.

Polymerizable Compound (4):

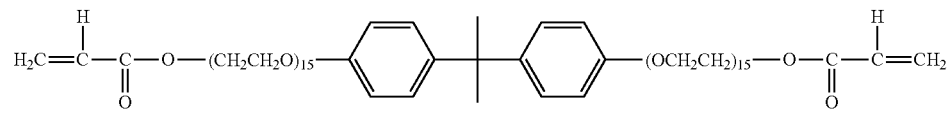

An infrared light reflector of Example 4 was produced according to the same process as in Example 1, except that the liquid crystal composition coating liquids (R41), (R42), (L41) and (L42) were used in place of (R11), (R12), (L11) and (L12).

Example 5

Liquid crystal composition coating liquids (R51), (R52), (L51) and (L52) were prepared in the same manner as that for the liquid crystal composition coating liquids (R11), (R12), (L11) and (L12), except that the polyfunctional polymerizable compound (1) was changed to the following polyfunctional polymerizable compound (5) (molecular weight: 2106). The viscosity at 23° C. of the coating liquids was 9.1 mPa·s, 8.9 mPa·s, 10.5 mPa·s and 10.1 mPa·s, respectively.
Polymerizable Compound (5):

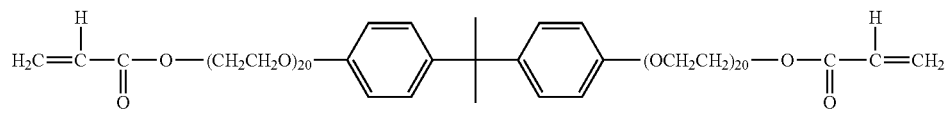

An infrared light reflector of Example 5 was produced according to the same process as in Example 1, except that the liquid crystal composition coating liquids (R51), (R52), (L51) and (L52) were used in place of (R11), (R12), (L11) and (L12).

The results are shown in Tables 5 and 6 below.

TABLE 5

Surface Properties of Infrared Light reflective Layer, and Cissing Defects and Surface Roughness II of Functional Layer Formed on the Layer

| | Infrared Light reflective Layer | Type of Coating Liquid Viscosity of Coating Liquid [mPa · s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 2 | coating liquid (R21) polymerizing compound (2): 0.500 parts by mass alignment controlling agent: 0.003 parts by mass | coating liquid (L21) 2.9 | 93.5 | 41.8 | 38.8 (σ = 0.2) | 0 | 34 |
| | coating liquid (L21) polymerizing compound (2): 0.500 parts by mass alignment controlling agent: 0.003 parts by mass | coating liquid (R22) 3.2 | 93.6 | 41.7 | 38.8 (σ = 0.3) | 1 | 38 |
| | coating liquid (R22) polymerizing compound (2): 0.500 parts by mass alignment controlling agent: 0.003 parts by mass | coating liquid (L22) 3.1 | 93.7 | 41.5 | 38.9 (σ = 0.5) | 3 | 39 |
| | coating liquid (L22) polymerizing compound (2): 0.500 parts by mass alignment controlling agent: 0.003 parts by mass | easy adhesion layer coating liquid (I) | 94.0 | 41.0 | 39.2 (σ = 0.8) | 8 | 45 |
| Example 3 | coating liquid (R31) polymerizing compound (3): 0.500 parts by mass alignment controlling agent: 0.003 parts by mass | coating liquid (L31) 3.5 | 92.1 | 43.1 | 38.0 (σ = 0.1) | 0 | 32 |
| | coating liquid (L31) polymerizing compound (3): 0.500 parts by mass alignment controlling agent: 0.003 parts by mass | coating liquid (R32) 3.9 | 92.2 | 43.0 | 38.1 (σ = 0.1) | 1 | 34 |
| | coating liquid (R32) polymerizing compound (3): 0.500 parts by mass alignment controlling agent: 0.003 parts by mass | coating liquid (L32) 3.8 | 92.4 | 42.8 | 38.2 (σ = 0.1) | 1 | 34 |
| | coating liquid (L32) polymerizing compound (3): 0.500 parts by mass alignment controlling agent: 0.003 parts by mass | easy adhesion layer coating liquid (I) | 92.6 | 42.3 | 38.5 (σ = 0.1) | 3 | 38 |
| Example 4 | coating liquid (R41) polymerizing compound (4): 0.500 parts by mass alignment controlling agent: 0.003 parts by mass | coating liquid (L41) 5.7 | 93.1 | 42.1 | 38.6 (σ = 0.1) | 0 | 35 |
| | coating liquid (L41) polymerizing compound (4): 0.500 parts by mass alignment controlling agent: 0.003 parts by mass | coating liquid (R42) 6.9 | 93.2 | 41.9 | 38.7 (σ = 0.1) | 1 | 36 |
| | coating liquid (R42) polymerizing compound (4): 0.500 parts by mass alignment controlling agent: 0.003 parts by mass | coating liquid (L42) 6.6 | 93.6 | 41.7 | 38.8 (σ = 0.1) | 3 | 40 |
| | coating liquid (L42) polymerizing compound (4): 0.500 parts by mass alignment controlling agent: 0.003 parts by mass | easy adhesion layer coating liquid (I) | 93.9 | 41.2 | 39.1 (σ = 0.2) | 6 | 44 |
| Example 5 | coating liquid (R51) polymerizing compound (5): 0.500 parts by mass alignment controlling agent: 0.003 parts by mass | coating liquid (L51) 8.9 | 94.8 | 40.5 | 39.5 (σ = 0.1) | 0 | 36 |
| | coating liquid (L51) polymerizing compound (5): 0.500 parts by mass alignment controlling agent: 0.003 parts by mass | coating liquid (R52) 10.5 | 94.9 | 40.3 | 39.7 (σ = 0.1) | 1 | 41 |

TABLE 5-continued

Surface Properties of Infrared Light reflective Layer, and Cissing Defects and Surface Roughness II of Functional Layer Formed on the Layer

| Infrared Light reflective Layer | Type of Coating Liquid Viscosity of Coating Liquid [mPa · s] | Surface Properties of Infrared Light reflective Layer | | | Surface Condition of Coating Layer | |
|---|---|---|---|---|---|---|
| | | pure water contact angle [°] | methylene chloride contact angle [°] | surface energy [mN/m] | number of cissing defects [/m$^2$] | surface roughness Ra [nm] |
| coating liquid (R52) polymerizing compound (5): 0.500 parts by mass alignment controlling agent: 0.003 parts by mass | coating liquid (L52) 10.1 | 95.0 | 40.1 | 39.8 (σ = 0.2) | 4 | 44 |
| coating liquid (L52) polymerizing compound (5): 0.500 parts by mass alignment controlling agent: 0.003 parts by mass | easy adhesion layer coating liquid (I) | 95.2 | 39.8 | 40.0 (σ = 0.3) | 10 | 48 |

TABLE 6

Infrared Light Reflector Performance Evaluation Results II

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 2 | 5.2 | 21 | 8 | 30.9 |
| Example 3 | 6.2 | 24 | 6 | 30.7 |
| Example 4 | 7.3 | 32 | 5 | 30.4 |
| Example 5 | 6.8 | 26 | 6 | 30.2 |

From the above Tables, it is known that, in Example 3 and Example 4 where the polyfunctional polymerizable compound was changed to the polymerizable compound (3) and the polymerizable compound (4), respectively, the surface energy was lowered to the same degree as in Example 1 and, as a result, the cissing failure was prevented and the surface roughness of the coating layer was low. In addition, the film strength was increased and the film brittleness was reduced. Especially in Example 4 where the polymerizable compound (4) having a larger molecular weight was used, the effects were more remarkable.

In Example 2 where the polymerizable compound (2) having a small molecular weight was used, it may be considered that the polymerizable compound (2) would be located more eccentrically in the surface of the infrared light reflective layer; however, since the surface energy-reducing effect of the compound itself therein may be low, Example 2 is somewhat inferior to Example 3 in point of the cissing failure frequency and the surface roughness. In addition, since the molecular weight of the compound therein is small (that is, the chain of linking the polymerizing groups is short), Example 2 is also inferior in point of the effect of enhancing the film strength and the effect of reducing the film brittleness. However, since the molecular weight is small and since the compound would have little influence on the alignment of the cholesteric liquid crystal layer, the heat shieldability in Example 2 is on the same level as that in Comparative Example 1.

In Example 5 where the polymerizable compound (5) having a large molecular weight was used, the surface energy-reducing effect of the polymerizable compound (5) itself would be large; however, since the molecular weight is large and since the compound could hardly be located eccentrically in the surface of the infrared light reflective layer, Example 5 is somewhat inferior to Example 4 in point of the cissing failure frequency and the surface roughness. Example 5 was good in point of the effect of enhancing the film strength and the effect of reducing the film brittleness. In this, since the compound used would have some influence on the alignment of the cholesteric liquid crystal layer, the heat shieldability of the reflector was slightly lowered.

In Reference Examples 1 and 2, the relationship between the amount of the fluorine-containing alignment controlling agent and the coating cissing failure was investigated. In addition, in Examples 6 to 8, the addition amount dependence of the polyfunctional polymerizable compound and the alignment controlling agent was investigated by varying the amount of the alignment controlling agent therein.

Reference Example 1

Coating liquids (R11A), (R12A), (L11A) and (L12A) were prepared in the same manner as that for the liquid crystal composition coating liquids (R11), (R12), (L11) and (L12), except that the amount of the alignment controlling agent was changed from 0.003 parts by mass to 0.0005 parts by mass. The viscosity at 23° C. of the coating liquids was 3.8 mPa·s, 3.8 mPa·s, 4.1 mPa·s and 4.1 mPa·s, respectively.

An infrared light reflector of Reference Example 1 was produced according to the same process as in Example 1, except that (R11A), (R12A), (L11A) and (L12A) were used in place of the liquid crystal composition coating liquids (R11), (R12), (L11) and (L12).

Reference Example 2

Coating liquids (R1A), (R2A), (L1A) and (L2A) were prepared in the same manner as that for the liquid crystal composition coating liquids (R11A), (R12A), (L11A) and (L12A), except that the amount of the polyfunctional polymerizable compound (polymerizable compound (1)) was changed to 0 and the amount of the rod-shaped liquid crystal compound RM-257 was changed to 10.000 parts by mass. The viscosity at 23° C. of the coating liquids was 2.5 mPa·s, 2.4 mPa·s, 2.8 mPa·s and 2.6 mPa·s, respectively.

An infrared light reflector of Reference Example 2 was produced according to the same process as in Reference Example 1, except that (R1A), (R2A), (L1A) and (L2A) were used in place of the liquid crystal composition coating liquids (R11A), (R12A), (L11A) and (L12A).

Example 6

Coating liquids (R11B), (R12B), (L11B) and (L12B) were prepared in the same manner as that for the liquid crystal composition coating liquids (R11), (R12), (L11) and (L12), except that the amount of the alignment controlling agent was changed from 0.003 parts by mass to 0.001 parts by mass. The viscosity at 23° C. of the coating liquids was 3.8 mPa·s, 3.7 mPa·s, 4.1 mPa·s and 4.0 mPa·s, respectively.

An infrared light reflector of Example 6 was produced according to the same process as in Example 1, except that (R11B), (R12B), (L11B) and (L12B) were used in place of the liquid crystal composition coating liquids (R11), (R12), (L11) and (L12).

Comparative Example 2

Coating liquids (R1B), (R2B), (L1B) and (L2B) were prepared in the same manner as that for the liquid crystal composition coating liquids (R11B), (R12B), (L11B) and (L12B), except that the amount of the polyfunctional polymerizable compound (polymerizable compound (1)) was changed to 0 and the amount of the rod-shaped liquid crystal compound RM-257 was changed to 10.000 parts by mass. The viscosity at 23° C. of the coating liquids was 2.4 mPa·s, 2.4 mPa·s, 2.7 mPa·s and 2.6 mPa·s, respectively.

An infrared light reflector of Comparative Example 2 was produced according to the same process as in Example 6, except that (R1B), (R2B), (L1B) and (L2B) were used in place of the liquid crystal composition coating liquids (R11B), (R12B), (L11B) and (L12B).

Example 7

Coating liquids (R11C), (R12C), (L11C) and (L12C) were prepared in the same manner as that for the liquid crystal composition coating liquids (R11), (R12), (L11) and (L12), except that the amount of the alignment controlling agent was changed from 0.003 parts by mass to 0.005 parts by mass. The viscosity at 23° C. of the coating liquids was 3.7 mPa·s, 3.8 mPa·s, 4.0 mPa·s and 4.0 mPa·s, respectively.

An infrared light reflector of Example 7 was produced according to the same process as in Example 1, except that (R11C), (R12C), (L11C) and (L12C) were used in place of the liquid crystal composition coating liquids (R11), (R12), (L11) and (L12).

Comparative Example 3

Coating liquids (R1C), (R2C), (L1C) and (L2C) were prepared in the same manner as that for the liquid crystal composition coating liquids (R11C), (R12C), (L11C) and (L12C), except that the amount of the polyfunctional polymerizable compound (polymerizable compound (1)) was changed to 0 and the amount of the rod-shaped liquid crystal compound RM-257 was changed to 10.000 parts by mass. The viscosity at 23° C. of the coating liquids was 2.3 mPa·s, 2.3 mPa·s, 2.5 mPa·s and 2.5 mPa·s, respectively.

An infrared light reflector of Comparative Example 3 was produced according to the same process as in Example 7, except that (R1C), (R2C), (L1C) and (L2C) were used in place of the liquid crystal composition coating liquids (R11C), (R12C), (L11C) and (L12C).

Example 8

Coating liquids (R11D), (R12D), (L11D) and (L12D) were prepared in the same manner as that for the liquid crystal composition coating liquids (R11), (R12), (L11) and (L12), except that the amount of the alignment controlling agent was changed from 0.003 parts by mass to 0.010 parts by mass. The viscosity at 23° C. of the coating liquids was 3.7 mPa·s, 3.7 mPa·s, 4.0 mPa·s and 4.0 mPa·s, respectively.

An infrared light reflector of Example 8 was produced according to the same process as in Example 1, except that (R11D), (R12D), (L11D) and (L12D) were used in place of the liquid crystal composition coating liquids (R11), (R12), (L11) and (L12).

Comparative Example 4

Coating liquids (R1D), (R2D), (L1D) and (L2D) were prepared in the same manner as that for the liquid crystal composition coating liquids (R11D), (R12D), (L11D) and (L12D), except that the amount of the polyfunctional polymerizable compound (polymerizable compound (1)) was changed to 0 and the amount of the rod-shaped liquid crystal compound RM-257 was changed to 10.000 parts by mass. The viscosity at 23° C. of the coating liquids was 2.1 mPa·s, 2.1 mPa·s, 2.3 mPa·s and 2.2 mPa·s, respectively.

An infrared light reflector of Comparative Example 4 was produced according to the same process as in Example 8, except that (R1D), (R2D), (L1D) and (L2D) were used in place of the liquid crystal composition coating liquids (R11D), (R12D), (L11D) and (L12D).

The results are shown in the following Tables.

TABLE 7

Surface Properties of Infrared Light reflective Layer, and Cissing Defects and Surface Roughness III of Functional Layer Formed on the Layer

| | Infrared Light reflective Layer | Type of Coating Liquid Viscosity of Coating Liquid [mPa · s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m$^2$] | surface roughness Ra [nm] |
| Reference Example 1 | coating liquid (R11A) polymerizing compound (1): 0.500 parts by mass alignment controlling agent: 0.0005 parts by mass | coating liquid (L11A) 2.4 | 87.3 | 49.1 | 35.2 ($\sigma$ = 0.1) | 0 | 24 |
| | coating liquid (L11A) polymerizing compound (1): 0.500 parts by mass alignment controlling agent: 0.0005 parts by mass | coating liquid (R12A) 2.8 | 87.3 | 49.0 | 35.3 ($\sigma$ = 0.1) | 0 | 25 |
| | coating liquid (R12A) polymerizing compound (1): 0.500 parts by mass alignment controlling agent: 0.0005 parts by mass | coating liquid (L12A) 2.6 | 87.4 | 48.9 | 35.3 ($\sigma$ = 0.1) | 0 | 24 |
| | coating liquid (L12A) polymerizing compound (1): 0.500 parts by mass alignment controlling agent: 0.0005 parts by mass | easy adhesion layer coating liquid (I) | 87.6 | 48.6 | 35.4 ($\sigma$ = 0.1) | 0 | 26 |
| Reference | coating liquid (R1A) | coating liquid (L1A) | 91.5 | 44.4 | 37.3 | 0 | 30 |

TABLE 7-continued

Surface Properties of Infrared Light reflective Layer, and Cissing Defects and Surface Roughness III of Functional Layer Formed on the Layer

| | Infrared Light reflective Layer | Type of Coating Liquid Viscosity of Coating Liquid [mPa·s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 2 | polymerizing compound (1): 0.000 parts by mass alignment controlling agent: 0.0005 parts by mass coating liquid (L1A) | 3.7 | | | (σ = 0.1) | | |
| | polymerizing compound (1): 0.000 parts by mass alignment controlling agent: 0.0005 parts by mass coating liquid (R2A) | coating liquid (R2A) 4.1 | 91.6 | 44.4 | 37.3 (σ = 0.1) | 0 | 30 |
| | polymerizing compound (1): 0.000 parts by mass alignment controlling agent: 0.0005 parts by mass coating liquid (L2A) | coating liquid (L2A) 4 | 91.7 | 44.2 | 37.4 (σ = 0.1) | 2 | 32 |
| | polymerizing compound (1): 0.000 parts by mass alignment controlling agent: 0.0005 parts by mass | easy adhesion layer coating liquid (I) | 91.9 | 44.1 | 37.5 (σ = 0.1) | 4 | 35 |

TABLE 8

Infrared Light Reflector Performance Evaluation Results III

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Reference Example 1 | 6.9 | 23 | 6 | 26.8 |
| Reference Example 2 | 2.1 | 16 | 12 | 27.2 |

The above Tables confirm that, when the amount of the alignment controlling agent is small, the cissing failure frequency is naturally low even when the functional layer composition is applied onto the infrared light reflective layer, but the cissing failure frequency is further reduced by adding the polymerizable compound (1). In addition, the film strength is enhanced and the film brittleness is reduced. In Reference Example 1 and Reference Example 2, the amount of the alignment controlling agent is small, and therefore the alignment of the cholesteric liquid crystal layer is poor and the heat shieldability is low. It has been confirmed that the polymerizable compound (1) is effective for improving the surface condition of the overlaid layer, but is ineffective for improving the alignment itself of the cholesteric liquid crystal layer.

TABLE 9

Surface Properties of Infrared Light reflective Layer, and Cissing Defects and Surface Roughness IV of Functional Layer Formed on the Layer

| | Infrared Light reflective Layer | Type of Coating Liquid Viscosity of Coating Liquid [mPa·s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 6 | coating liquid (R11B) polymerizing compound (1): 0.500 parts by mass alignment controlling agent: 0.001 parts by mass coating liquid (L11B) | coating liquid (L11B) 3.7 | 88.6 | 48.0 | 35.6 (σ = 0.1) | 0 | 32 |
| | polymerizing compound (1): 0.500 parts by mass alignment controlling agent: 0.001 parts by mass coating liquid (R12B) | coating liquid (R12B) 4.1 | 88.7 | 47.9 | 35.7 (σ = 0.1) | 0 | 32 |
| | polymerizing compound (1): 0.500 parts by mass alignment controlling agent: 0.001 parts by mass coating liquid (L12B) | coating liquid (L12B) 4 | 88.9 | 47.8 | 35.7 (σ = 0.1) | 0 | 34 |
| | polymerizing compound (1): 0.500 parts by mass alignment controlling agent: 0.001 parts by mass | easy adhesion layer coating liquid (I) | 89.2 | 47.5 | 35.8 (σ = 0.1) | 2 | 37 |
| Comparative Example 2 | coating liquid (R1B) polymerizing compound (1): 0.000 parts by mass alignment controlling agent: 0.001 parts by mass coating liquid (L1B) | coating liquid (L1B) 2.4 | 92.5 | 40.2 | 39.6 (σ = 0.1) | 0 | 39 |
| | polymerizing compound (1): 0.000 parts by mass alignment controlling agent: 0.001 parts by mass coating liquid (R2B) | coating liquid (R2B) 2.7 | 92.7 | 40.2 | 39.6 (σ = 0.1) | 1 | 48 |
| | polymerizing compound (1): 0.000 parts by mass alignment controlling agent: 0.001 parts by mass coating liquid (L2B) | coating liquid (L2B) 2.6 | 92.8 | 40.0 | 39.7 (σ = 0.2) | 9 | 56 |
| | polymerizing compound (1): 0.000 parts by mass alignment controlling agent: 0.001 parts by mass | easy adhesion layer coating liquid (I) | 93.0 | 39.8 | 39.8 (σ = 0.4) | 63 | 72 |

TABLE 10

Infrared Light Reflector Performance Evaluation Results IV

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 6 | 7.1 | 25 | 6 | 30.1 |
| Comparative Example 2 | 2.1 | 17 | 10 | 30.4 |

The above Tables confirms that, in Example 6, the cissing failure was prevented in coating the infrared light reflective layer with the functional layer composition and the surface roughness of the coating layer was low, like in Example 1. While the heat shieldability of the infrared light reflector of Example 6 was comparable to that of Comparative Example 2, the film strength of the former was enhanced and the film brittleness thereof was reduced.

TABLE 12

Infrared Light Reflector Performance Evaluation Results V

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 7 | 7.0 | 26 | 6 | 30.1 |
| Comparative Example 3 | 2.2 | 19 | 10 | 30.3 |

The above Tables confirms that, in Example 7, the cissing failure was prevented in coating the infrared light reflective layer with the functional layer composition and the surface roughness of the coating layer was low, like in Example 1. While the heat shieldability of the infrared light reflector of Example 7 was comparable to that of Comparative Example 3, the film strength of the former was enhanced and the film brittleness thereof was reduced.

TABLE 11

Surface Properties of Infrared Light reflective Layer, and Cissing Defects and Surface Roughness V of Functional Layer Formed on the Layer

| | Infrared Light reflective Layer | Type of Coating Liquid Viscosity of Coating Liquid [mPa·s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 7 | coating liquid (R11C) polymerizing compound (1): 0.500 parts by mass alignment controlling agent: 0.005 parts by mass | coating liquid (L11C) 3.8 | 93.6 | 41.7 | 38.8 (σ = 0.1) | 0 | 35 |
| | coating liquid (L11C) polymerizing compound (1): 0.500 parts by mass alignment controlling agent: 0.005 parts by mass | coating liquid (R12C) 4 | 93.8 | 41.5 | 38.9 (σ = 0.1) | 0 | 38 |
| | coating liquid (R12C) polymerizing compound (1): 0.500 parts by mass alignment controlling agent: 0.005 parts by mass | coating liquid (L12C) 4 | 94.1 | 41.3 | 39.1 (σ = 0.2) | 2 | 42 |
| | coating liquid (L12C) polymerizing compound (1): 0.500 parts by mass alignment controlling agent: 0.005 parts by mass | easy adhesion layer coating liquid (I) | 94.6 | 40.8 | 39.4 (σ = 0.3) | 5 | 48 |
| Comparative Example 3 | coating liquid (R1C) polymerizing compound (1): 0.000 parts by mass alignment controlling agent: 0.005 parts by mass | coating liquid (L1C) 2.3 | 98.2 | 38.1 | 41.3 (σ = 0.2) | 3 | 45 |
| | coating liquid (L1C) polymerizing compound (1): 0.000 parts by mass alignment controlling agent: 0.005 parts by mass | coating liquid (R2C) 2.5 | 98.4 | 37.9 | 41.4 (σ = 0.3) | 17 | 70 |
| | coating liquid (R2C) polymerizing compound (1): 0.000 parts by mass alignment controlling agent: 0.005 parts by mass | coating liquid (L2C) 2.5 | 98.7 | 37.7 | 41.6 (σ = 0.5) | 93 | 82 |
| | coating liquid (L2C) polymerizing compound (1): 0.000 parts by mass alignment controlling agent: 0.005 parts by mass | easy adhesion layer coating liquid (I) | 99.2 | 37.4 | 41.9 (σ = 0.8) | 424 | 102 |

TABLE 13

Surface Properties of Infrared Light reflective Layer, and Cissing Defects and Surface Roughness VI of Functional Layer Formed on the Layer

| | Infrared Light reflective Layer | Type of Coating Liquid Viscosity of Coating Liquid [mPa·s] | Surface Properties of Infrared Light reflective Layer | | | Surface Condition of Coating Layer | |
|---|---|---|---|---|---|---|---|
| | | | pure water contact angle [°] | methylene chloride contact angle [°] | surface energy [mN/m] | number of cissing defects [/m²] | surface roughness Ra [nm] |
| Example 8 | coating liquid (R11D) polymerizing compound (1): 0.500 parts by mass alignment controlling agent: 0.010 parts by mass | coating liquid (L11D) 3.7 | 96.0 | 39.6 | 40.2 (σ = 0.1) | 0 | 42 |
| | coating liquid (L11D) polymerizing compound (1): 0.500 parts by mass alignment controlling agent: 0.010 parts by mass | coating liquid (R12D) 4 | 96.3 | 39.4 | 40.3 (σ = 0.2) | 1 | 51 |
| | coating liquid (R12D) polymerizing compound (1): 0.500 parts by mass alignment controlling agent: 0.010 parts by mass | coating liquid (L12D) 4 | 96.5 | 39.2 | 40.4 (σ = 0.3) | 4 | 64 |
| | coating liquid (L12D) polymerizing compound (1): 0.500 parts by mass alignment controlling agent: 0.010 parts by mass | easy adhesion layer coating liquid (I) | 97.0 | 38.8 | 40.7 (σ = 0.5) | 10 | 82 |
| Comparative Example 4 | coating liquid (R1D) polymerizing compound (1): 0.000 parts by mass alignment controlling agent: 0.010 parts by mass | coating liquid (L1D) 2.1 | 99.8 | 36.9 | 42.3 (σ = 0.2) | 6 | 55 |
| | coating liquid (L1D) polymerizing compound (1): 0.000 parts by mass alignment controlling agent: 0.010 parts by mass | coating liquid (R2D) 2.3 | 100.1 | 36.7 | 42.4 (σ = 0.3) | 32 | 84 |
| | coating liquid (R2D) polymerizing compound (1): 0.000 parts by mass alignment controlling agent: 0.010 parts by mass | coating liquid (L2D) 2.2 | 100.5 | 36.5 | 42.6 (σ = 0.6) | 124 | 108 |
| | coating liquid (L2D) polymerizing compound (1): 0.000 parts by mass alignment controlling agent: 0.010 parts by mass | easy adhesion layer coating liquid (I) | 101.2 | 36.1 | 43.0 (σ = 0.9) | 568 | 126 |

TABLE 14

Infrared Light Reflector Performance Evaluation Results VI

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 8 | 6.9 | 23 | 6 | 26.2 |
| Comparative Example 4 | 2.0 | 17 | 12 | 26.9 |

The above Tables confirms that, in Example 8, the cissing failure was prevented in coating the infrared light reflective layer with the functional layer composition and the surface roughness of the coating layer was reduced. In Example 8, however, the number of the cissing defects was naturally large and the surface roughness was high, and therefore in this, even when the polymerizable compound (1) was added, the effect of reducing the cissing failure and reducing the surface roughness was still somewhat inferior to that in Example 1 and Example 7. The heat shieldability of the infrared light reflector of Example 8 was almost comparable to that of Comparative Example 4; however, since the surface roughness thereof is relatively large, the heat shieldability of the reflector of Example 8 was relatively inferior to that of the reflectors of Example 1 and Example 7. In Example 8, the effect of increasing the film strength and reducing the film brittleness was good and was comparable to that in Example 1 and Example 7.

In Example 9 to Example 12, the addition amount dependence of the polyfunctional polymerizable compound (and also the addition ratio dependence thereof relative to the alignment controlling agent) was investigated by varying the amount of the polyfunctional polymerizable compound therein.

Example 9

Coating liquids (R11E), (R12E), (L11E) and (L12E) were prepared in the same manner as that for the liquid crystal composition coating liquids (R11), (R12), (L11) and (L12), except that the amount of the polyfunctional polymerizable compound (polymerizable compound (1)) was changed from 0.500 parts by mass to 1.500 parts by mass, and the amount of the chiral agent LC-756 and that of the chiral agent compound 2 were changed so that the selective reflection center wavelength could be 1040 nm and 1240 nm. The viscosity at 23° C. of the coating liquids was 4.7 mPa·s, 4.6 mPa·s, 5.4 mPa·s and 5.4 mPa·s, respectively.

An infrared light reflector of Example 9 was produced according to the same process as in Example 1, except that the liquid crystal composition coating liquids (R11E), (R12E), (L11E) and (L12E) were used in place of (R11), (R12), (L11) and (L12).

Example 10

Coating liquids (R11F), (R12F), (L11F) and (L12F) were prepared in the same manner as that for the liquid crystal composition coating liquids (R11), (R12), (L11) and (L12), except that the amount of the polyfunctional polymerizable compound (polymerizable compound (1)) was changed from 0.500 parts by mass to 1.000 parts by mass, and the amount of the chiral agent LC-756 and that of the chiral agent compound 2 were changed so that the selective reflection center wavelength could be 1040 nm and 1240 nm. The viscosity at 23° C. of the coating liquids was 4.3 mPa·s, 4.3 mPa·s, 4.8 mPa·s and 4.8 mPa·s, respectively.

An infrared light reflector of Example 10 was produced according to the same process as in Example 1, except that the liquid crystal composition coating liquids (R11F), (R12F), (L11F) and (L12F) were used in place of (R11), (R12), (L11) and (L12).

Example 11

Coating liquids (R11G), (R12G), (L11G) and (L12G) were prepared in the same manner as that for the liquid crystal composition coating liquids (R11), (R12), (L11) and (L12), except that the amount of the polyfunctional polymerizable compound (polymerizable compound (1)) was changed from 0.500 parts by mass to 0.150 parts by mass, and the amount of the chiral agent LC-756 and that of the chiral agent compound 2 were changed so that the selective reflection center wavelength could be 1040 nm and 1240 nm. The viscosity at 23° C. of the coating liquids was 3.0 mPa·s, 3.0 mPa·s, 3.3 mPa·s and 3.2 mPa·s, respectively.

An infrared light reflector of Example 11 was produced according to the same process as in Example 1, except that the liquid crystal composition coating liquids (R11G), (R12G), (L11G) and (L12G) were used in place of (R11), (R12), (L11) and (L12).

Example 12

Coating liquids (R11H), (R12H), (L11H) and (L12H) were prepared in the same manner as that for the liquid crystal composition coating liquids (R11), (R12), (L11) and (L12), except that the amount of the polyfunctional polymerizable compound (polymerizable compound (1)) was changed from 0.500 parts by mass to 0.050 parts by mass, and the amount of the chiral agent LC-756 and that of the chiral agent compound 2 were changed so that the selective reflection center wavelength could be 1040 nm and 1240 nm. The viscosity at 23° C. of the coating liquids was 2.5 mPa·s, 2.5 mPa·s, 2.8 mPa·s and 2.8 mPa·s, respectively.

An infrared light reflector of Example 12 was produced according to the same process as in Example 1, except that the liquid crystal composition coating liquids (R11H), (R12H), (L11H) and (L12H) were used in place of (R11), (R12), (L11) and (L12).

The results are shown in the following Tables.

TABLE 15

Surface Properties of Infrared Light reflective Layer, and Cissing Defects and Surface Roughness VII of Functional Layer Formed on the Layer

| | Infrared Light reflective Layer | Type of Coating Liquid Viscosity of Coating Liquid [mPa · s] | pure water contact angle [°] | methylene chloride contact angle [°] | surface energy [mN/m] | number of cissing defects [/m²] | surface roughness Ra [nm] |
|---|---|---|---|---|---|---|---|
| Example 9 | coating liquid (R11E) polymerizing compound (1): 1.500 parts by mass alignment controlling agent: 0.003 parts by mass | coating liquid (L11E) 4.6 | 87.6 | 47.6 | 35.9 ($\sigma = 0.1$) | 0 | 27 |
| | coating liquid (L11E) polymerizing compound (1): 1.500 parts by mass alignment controlling agent: 0.003 parts by mass | coating liquid (R12E) 5.4 | 87.6 | 47.5 | 36.0 ($\sigma = 0.1$) | 0 | 27 |
| | coating liquid (R12E) polymerizing compound (1): 1.500 parts by mass alignment controlling agent: 0.003 parts by mass | coating liquid (L12E) 5.4 | 87.7 | 47.4 | 36.0 ($\sigma = 0.1$) | 0 | 28 |
| | coating liquid (L12E) polymerizing compound (1): 1.500 parts by mass alignment controlling agent: 0.003 parts by mass | easy adhesion layer coating liquid (I) | 87.9 | 47.1 | 36.1 ($\sigma = 0.1$) | 0 | 28 |
| Example 10 | coating liquid (R11F) polymerizing compound (1): 1.000 parts by mass alignment controlling agent 0.003 parts by mass | coating liquid (L11F) 4.3 | 88.1 | 47.0 | 36.2 ($\sigma = 0.1$) | 0 | 27 |
| | coating liquid (L11F) polymerizing compound (1): 1.000 parts by mass alignment controlling agent 0.003 parts by mass | coating liquid (R12F) 4.8 | 88.2 | 46.8 | 36.3 ($\sigma = 0.1$) | 0 | 28 |
| | coating liquid (R12F) polymerizing compound (1): 1.000 parts by mass alignment controlling agent: 0.003 parts by mass | coating liquid (L12F) 4.8 | 88.4 | 46.7 | 36.3 ($\sigma = 0.1$) | 0 | 29 |
| | coating liquid (L12F) polymerizing compound (1): 1.000 parts by mass alignment controlling agent: 0.003 parts by mass | easy adhesion layer coating liquid (I) | 88.6 | 46.5 | 36.4 ($\sigma = 0.1$) | 0 | 28 |
| Example 11 | coating liquid (R11G) polymerizing compound (1): 0.150 parts by mass alignment controlling agent: 0.003 parts by mass | coating liquid (L11G) 3 | 95.0 | 40.7 | 39.5 ($\sigma = 0.1$) | 0 | 40 |
| | coating liquid (L11G) polymerizing compound (1): 0.150 parts by mass alignment controlling agent: 0.003 parts by mass | coating liquid (R12G) 3.3 | 95.2 | 40.5 | 39.6 ($\sigma = 0.2$) | 0 | 42 |
| | coating liquid (R12G) polymerizing compound (1): 0.150 parts by mass alignment controlling agent: 0.003 parts by mass | coating liquid (L12G) 3.2 | 95.4 | 40.2 | 39.8 ($\sigma = 0.3$) | 3 | 45 |
| | coating liquid (L12G) polymerizing compound (1): 0.150 parts by mass alignment controlling agent: 0.003 parts by mass | easy adhesion layer coating liquid (I) | 95.7 | 39.8 | 40.0 ($\sigma = 0.5$) | 7 | 50 |
| Example 12 | coating liquid (R11H) polymerizing compound (1): 0.050 parts by mass alignment controlling agent: 0.003 parts by mass | coating liquid (L11H) 2.5 | 95.8 | 39.6 | 40.1 ($\sigma = 0.1$) | 0 | 46 |
| | coating liquid (L11H) | coating liquid (R12H) | 96.0 | 39.5 | 40.2 | 2 | 52 |

TABLE 15-continued

Surface Properties of Infrared Light reflective Layer, and Cissing Defects and Surface Roughness VII of Functional Layer Formed on the Layer

| | | Type of Coating | Surface Properties of Infrared Light reflective Layer | | | Surface Condition of Coating Layer | |
|---|---|---|---|---|---|---|---|
| | Infrared Light reflective Layer | Liquid Viscosity of Coating Liquid [mPa · s] | pure water contact angle [°] | methylene chloride contact angle [°] | surface energy [mN/m] | number of cissing defects [/m²] | surface roughness Ra [nm] |
| | polymerizing compound (1): 0.050 parts by mass alignment controlling agent 0.003 parts by mass | 2.8 | | | (σ = 0.2) | | |
| | coating liquid (R12H) polymerizing compound (1): 0.050 parts by mass alignment controlling agent: 0.003 parts by mass | coating liquid (L12H) 2.8 | 96.3 | 39.3 | 40.4 (σ = 0.4) | 5 | 60 |
| | coating liquid (L12H) polymerizing compound (1): 0.050 parts by mass alignment controlling agent: 0.003 parts by mass | easy adhesion layer coating liquid (I) | 96.7 | 39.0 | 40.6 (σ = 0.6) | 10 | 75 |

TABLE 16

Infrared Light Reflector Performance Evaluation Results VII

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 9 | 8.3 | 34 | 5 | 25.4 |
| Example 10 | 8.1 | 31 | 5 | 26.7 |
| Example 11 | 6.5 | 22 | 6 | 30.9 |
| Example 12 | 5.1 | 20 | 8 | 30.2 |

From the above Tables, it is known that, in Example 10, the cissing failure was prevented more in coating the infrared light reflective layer with the functional layer composition and the surface roughness of the coating layer was reduced more than in Example 1. In addition, the film strength of the infrared light reflector of Example 10 was improved more and the film brittleness thereof was reduced more. However, in Example 10, since the alignability in the cholesteric liquid crystal layer was low, the heat shieldability of the reflector was low.

The tendency in Example 10 was more remarkable in Example 9; however, in consideration of the increase in the amount of the polymerizable compound (1) in Example 9, the effect would be almost saturated.

In Example 11, the effect of reducing the cissing defects in coating the infrared light reflective layer with the functional layer composition is relatively lower than in Example 1, and the surface roughness of the coating layer therein is relatively larger. In addition, the film strength of the infrared light reflector of Example 11 is relatively low. However, in this, the alignability in the cholesteric liquid crystal layer was somewhat bettered, and as a result, the heat shieldability of the reflector was somewhat increased.

In Example 12, the effect of preventing the cissing failure in coating the infrared light reflective layer with the functional layer composition was further lower than in Example 1 and the surface roughness of the coating layer was larger. In addition, the film strength of the infrared light reflector of Example 12 was not so high and the film brittleness thereof could not be reduced so much. In this, the alignability in the cholesteric liquid crystal layer would be bettered, but since the surface roughness of the layer was large, the heat shieldability of the reflector of Example 12 was on the same level as that of Example 1.

The constitutions of the following Examples 13 to 15 were investigated as infrared light reflectors capable of satisfying all the requirements of the cissing failure prevention, surface roughness reduction, film strength enhancement, film brittleness reduction and heat shieldability.

Example 13

An infrared light reflector of Example 13 was produced according to the same process as in Example 1, except that the liquid crystal composition coating liquids (R11G), (R12F), (L11G) and (L12F) were used in place of (R11), (R12), (L11) and (L12).

The results are shown in the following Tables.

TABLE 17

Surface Properties of Infrared Light reflective Layer, and Cissing Defects and Surface Roughness VIII of Functional Layer Formed on the Layer

| | | Type of Coating | Surface Properties of Infrared Light reflective Layer | | | Surface Condition of Coating Layer | |
|---|---|---|---|---|---|---|---|
| | Infrared Light reflective Layer | Liquid Viscosity of Coating Liquid [mPa · s] | pure water contact angle [°] | methylene chloride contact angle [°] | surface energy [mN/m] | number of cissing defects [/m²] | surface roughness Ra [nm] |
| Example 13 | coating liquid (R11G) polymerizing compound (1): 0.150 parts by mass alignment controlling agent: 0.003 parts by mass | coating liquid (L11G) 3 | 95.0 | 40.7 | 39.5 (σ = 0.1) | 0 | 40 |
| | coating liquid (L11G) polymerizing compound (1): 0.150 parts by mass | coating liquid (R12F) 4.8 | 95.2 | 40.5 | 39.6 (σ = 0.2) | 0 | 42 |

TABLE 17-continued

Surface Properties of Infrared Light reflective Layer, and Cissing Defects and Surface Roughness VIII of Functional Layer Formed on the Layer

| | | Type of Coating | Surface Properties of Infrared Light reflective Layer | | | Surface Condition of Coating Layer | |
|---|---|---|---|---|---|---|---|
| | | | | methylene | | | |
| | Infrared Light reflective Layer | Liquid Viscosity of Coating Liquid [mPa · s] | pure water contact angle [°] | chloride contact angle [°] | surface energy [mN/m] | number of cissing defects [/m²] | surface roughness Ra [nm] |
| | alignment controlling agent: 0.003 parts by mass coating liquid (R12F) polymerizing compound (1): 1.000 parts by mass alignment controlling agent: 0.003 parts by mass | coating liquid (L12F) 4.8 | 88.6 | 46.5 | 36.4 (σ = 0.2) | 0 | 42 |
| | coating liquid (L12F) polymerizing compound (1): 1.000 parts by mass alignment controlling agent: 0.003 parts by mass | easy adhesion layer coating liquid (I) | 88.8 | 46.3 | 36.5 (σ = 0.2) | 0 | 44 |

TABLE 18

Infrared Light Reflector Performance Evaluation Results VIII

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 13 | 7.8 | 29 | 5 | 28.9 |

The above Tables confirms that, in Example 13, the cissing failure was prevented more in coating the infrared light reflective layer with the functional layer composition and the surface roughness of the coating layer was reduced more than in Example 1. In this, the film strength of the infrared light reflector was enhanced more and the film brittleness thereof was reduced more, or that is, the reflector performance in Example 13 was comparable to that in Example 10. Though the alignability in the cholesteric liquid crystal layer was relatively reduced and the heat shieldability was lower than in Example 1; however, the reflector performance was better than in Example 11. It is considered that, in the lower half of the infrared light reflective layer ((R11G), (L11G)), the alignability of the cholesteric liquid crystal layer could be bettered, and in the upper half of the infrared light reflective layer ((R12F), (L12F)), the film strength of the infrared light reflector could be increased and the film brittleness thereof could be reduced.

Example 14

Coating liquids (R11I) and (L11I) were prepared in the same manner as that for the liquid crystal composition coating liquids (R11G) and (L11G), except that the amount of the alignment controlling agent was changed from 0.003 parts by mass to 0.010 parts by mass. The viscosity at 23° C. of the coating liquids was 3.0 mPa·s and 3.2 mPa·s, respectively.

An infrared light reflector of Example 14 was produced according to the same process as in Example 13, except that the liquid crystal composition coating liquids (R11I) and (L11I) were used in place of (R11G) and (L11G).

The results are shown in the following Tables.

TABLE 19

Surface Properties of Infrared Light reflective Layer, and Cissing Defects and Surface Roughness IX of Functional Layer Formed on the Layer

| | | Type of Coating | Surface Properties of Infrared Light reflective Layer | | | Surface Condition of Coating Layer | |
|---|---|---|---|---|---|---|---|
| | | | | methylene | | | |
| | Infrared Light reflective Layer | Liquid Viscosity of Coating Liquid [mPa · s] | pure water contact angle [°] | chloride contact angle [°] | surface energy [mN/m] | number of cissing defects [/m²] | surface roughness Ra [nm] |
| Example 14 | coating liquid (R11I) polymerizing compound (1): 0.150 parts by mass alignment controlling agent: 0.001 parts by mass | coating liquid (L11I) 3.2 | 92.5 | 44.5 | 37.3 (σ = 0.1) | 0 | 35 |
| | coating liquid (L11I) polymerizing compound (1): 0.150 parts by mass alignment controlling agent: 0.001 parts by mass | coating liquid (R12F) 4.8 | 92.7 | 44.3 | 37.4 (σ = 0.1) | 0 | 37 |
| | coating liquid (R12F) polymerizing compound (1): 1.000 parts by mass alignment controlling agent: 0.003 parts by mass | coating liquid (L12F) 4.8 | 88.6 | 46.5 | 36.4 (σ = 0.1) | 0 | 38 |
| | coating liquid (L12F) polymerizing compound (1): 1.000 parts by mass alignment controlling agent: 0.003 parts by mass | easy adhesion layer coating liquid (I) | 88.8 | 46.3 | 36.5 (σ = 0.1) | 0 | 39 |

TABLE 20

Infrared Light Reflector Performance Evaluation Results IX

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 14 | 7.8 | 30 | 5 | 30.1 |

In Example 14, the amount of the alignment controlling agent in the lower half of the infrared light reflective layer ((R11I), (L11I)) was reduced, as compared with that in Example 13.

The above Tables confirm that the heat shieldability of the infrared light reflector can be increased by reducing the surface roughness while maintaining the alignability of the cholesteric liquid crystal layer as such.

Example 15

An infrared light reflector of Example 15 was produced according to the same process as in Example 14, except that the liquid crystal composition coating liquids (R11F), (R12G), (L11F) and (L12G) were used in place of (R11G), (R12F), (L11G) and (L12F).

The results are shown in the following Tables.

layer ((R11F), (L11F)) and that in the upper half thereof ((R12G), (L12G)) were inverted.

The above Tables confirm that, since the amount of the polyfunctional polymerizable compound on the surface side (air interface side) is smaller than the amount of the polyfunctional polymerizable compound on the substrate side in the infrared light reflector of Example 15, the film strength of the reflector was somewhat lower than that in Example 13. Regarding the film brittleness, since the brittleness on the surface side was lower than that on the substrate side in Example 15, the film brittleness of the reflector as a whole was rather worsened. The low alignability in the cholesteric liquid crystal layer on the substrate side had some influence on the heat shieldability of the reflector of Example 15, and therefore the heat shieldability in Example 15 was relatively lower than in Example 13.

Example 16

The infrared light reflector of Example 1 produced in the above was laminated with an interlayer sheet of polyvinyl butyral (thickness: 380 μm) for laminated glass, using a laminator (by Taisei Laminator) (heating temperature: 80° C., pressure: 1.5 kg/cm², conveying speed: 0.1 m/min), thereby producing a laminated interlayer sheet for laminated glass.

Next, the laminated interlayer sheet for laminated glass produced in the above was sandwiched between two transparent glass sheets (thickness: 2 mm), put into a rubber bag,

TABLE 21

Surface Properties of Infrared Light reflective Layer, and Cissing Defects and Surface Roughness X of Functional Layer Formed on the Layer

| | | | Surface Properties of Infrared Light reflective Layer | | | Surface Condition of Coating Layer | |
|---|---|---|---|---|---|---|---|
| | | Type of Coating | | methylene | | | |
| | Infrared Light reflective Layer | Liquid Viscosity of Coating Liquid [mPa·s] | pure water contact angle [°] | chloride contact angle [°] | surface energy [mN/m] | number of cissing defects [/m²] | surface roughness Ra [nm] |
| Example 15 | coating liquid (R11F) polymerizing compound (1): 1.000 part by mass alignment controlling agent: 0.003 parts by mass | coating liquid (L11F) 4.3 | 88.1 | 47.0 | 36.2 (σ = 0.1) | 0 | 27 |
| | coating liquid (L11F) polymerizing compound (1): 1.000 part by mass alignment controlling agent: 0.003 parts by mass | coating liquid (R12G) 3.3 | 88.2 | 46.8 | 36.3 (σ = 0.1) | 0 | 28 |
| | coating liquid (R12G) polymerizing compound (1): 0.150 parts by mass alignment controlling agent: 0.003 parts by mass | coating liquid (L12G) 3.2 | 94.9 | 40.8 | 39.4 (σ = 0.1) | 1 | 36 |
| | coating liquid (L12G) polymerizing compound (1): 0.150 parts by mass alignment controlling agent: 0.003 parts by mass | easy adhesion layer coating liquid (I) | 95.1 | 40.6 | 39.5 (σ = 0.2) | 6 | 38 |

TABLE 22

Infrared Light Reflector Performance Evaluation Results X

| | Film Strength | | Film Brittleness | Heat Shieldability |
|---|---|---|---|---|
| | elongation at rupture [%] | stress at rupture [MPa] | Evaluation (cylindrical mandrel) | Evaluation (reflectance at 780 to 1400 nm) |
| Example 15 | 7.2 | 26 | 8 | 28.5 |

Example 15 differs from Example 13 in that the amount of the polyfunctional polymerizable compound (polymerizable compound (1)) in the lower half of the infrared light reflective and depressurized via a vacuum pump. Subsequently, this was heated up to 90° C. under reduced pressure, then kept as such for 30 minutes, and thereafter once restored to room temperature and ordinary pressure. Next, this was put in an autoclave and kept therein under a pressure of 1.3 MPa and at a temperature of 130° C. for 20 minutes. This was restored to room temperature and ordinary pressure thereby producing laminated glass with a function of infrared light reflection of Example 16.

The surface condition of the infrared light reflector in the laminated glass was checked visually, and any trouble of cracking, crazing or wrinkling was not seen, from which it is confirmed that the surface condition of the infrared light reflector did not deteriorate in the process of producing the laminated glass.

In addition, the infrared light reflectivity-having laminated glass was analyzed for the heat shieldability thereof. The laminated glass had a reflectance of 34.1%, which was on the same level as that in Example 1 (film-like infrared light reflector). This confirms that the performance of the infrared light reflector did not deteriorate in the process of producing the laminated glass.

The above results confirm the following: According to the invention, there is obtained an infrared light reflector which has an infrared light reflective layer with a cholesteric liquid crystal phase fixed therein and in which the surface of the infrared light reflective layer is free from coating liquid cissing failure.

In particular, the invention has confirmed that, when a functional layer composition is applied onto the surface of the infrared light reflective layer, there occurs no surface condition trouble such as increase in surface roughness, and an infrared light reflector in which the alignment of the cholesteric liquid crystal layer is good and which has excellent heat shieldability can be obtained.

In addition, the invention has also confirmed that an infrared light reflector having increased film strength (stress at rupture, elongation at rupture) and free from a trouble of film brittleness can be obtained.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-187305, filed on Aug. 24, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An infrared light reflector having an infrared light reflective layer comprising an infrared light reflective layer composition that contains a polyfunctional polymerizable compound, a cholesteric liquid crystal compound and a fluorine-containing alignment controlling agent in an amount of at least 60 ppm relative to the liquid crystal compound, wherein when a functional layer composition is applied onto at least one surface of the infrared light reflective layer, the number of the coating liquid cissing defects having a diameter of at least 5 μm is at most 10/m².

2. The infrared light reflector according to claim 1, wherein the coating thickness after curing of the functional layer composition is from 1 to 10 μm.

3. The infrared light reflector according to claim 1, wherein the functional layer composition contains a polyfunctional polymerizable compound.

4. The infrared light reflector according to claim 1, wherein the contact angle to pure water on the surface of the infrared light reflective layer is from 85 to 100 degrees.

5. The infrared light reflector according to claim 1, wherein a mean value of surface energy of at least one surface of the infrared light reflective layer is at most 40 mN/m.

6. The infrared light reflector according to claim 1, wherein a standard deviation σ of a fluctuation in surface energy of at least one surface of the infrared light reflective layer is at most 0.5 mN/m.

7. The infrared light reflector according to claim 1, wherein the surface roughness Ra of at least one surface of the infrared light reflective layer is at most 50 nm.

8. The infrared light reflector according to claim 1, wherein the molecular weight of the polyfunctional polymerizable compound is from 350 to 2000.

9. The infrared light reflector according to claim 1, wherein the polyfunctional polymerizable compound contains at least one divalent aromatic ring group having from 6 to 30 carbon atoms and is non-liquid crystalline.

10. The infrared light reflector according to claim 1, wherein the polyfunctional polymerizable compound has at least two (meth)acryloyl groups.

11. The infrared light reflector according to claim 1, wherein the polyfunctional polymerizable compound has a structure represented by the following general formula (I):

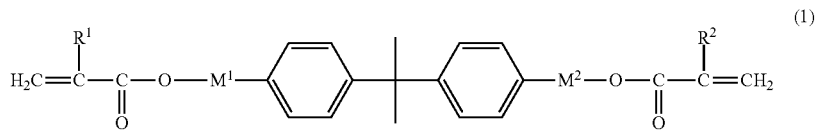

wherein $R^1$ and $R^2$ each independently represent a hydrogen atom or a methyl group; $M^1$ and $M^2$ each independently represent $-(CH_2-CH_2-O)_n-$, $-(O-CH_2-CH_2)_n-$, $-(CH_2-CH_2-CH_2-O)_m-$, $-(O-CH_2-CH_2-CH_2)_m-$, $-(CH_2)_p$ or their combination; n, m and p each independently indicate an integer of from 1 to 50.

12. The infrared light reflector according to claim 1, wherein a blend ratio by mass of the polyfunctional polymerizable compound and the fluorine-containing alignment controlling agent in the infrared light reflective layer composition is from 50/1 to 1000/1.

13. The infrared light reflector according to claim 1, wherein a blend ratio by mass of the polyfunctional polymerizable compound and the fluorine-containing alignment controlling agent in the infrared light reflective layer composition is from 60/1 to 900/1.

14. The infrared light reflector according to claim 1, wherein the viscosity of the infrared light reflective layer composition is from 0.1 to 10 mPa·s.

15. The infrared light reflector according to claim 1, wherein the total thickness of the infrared light reflective layer is from 10 to 60 μm.

16. The infrared light reflector according to claim 1, wherein the infrared light reflective layer includes from 2 to 12 cholesteric liquid crystal layers.

17. The infrared light reflector according to claim 16, wherein the infrared light reflective layers including from 2 to 12 cholesteric liquid crystal layers are laminated on a substrate, and the cholesteric liquid crystal layers are formed each by polymerizing a cholesteric liquid crystal layer composition, and the amount of the polyfunctional polymerizable compound contained in the cholesteric liquid crystal layer composition increases sequentially from the cholesteric liquid crystal layer composition on the side of the substrate.

18. The infrared light reflector according to claim 17, wherein the cholesteric liquid crystal layer composition further contains a fluorine-containing alignment controlling agent, the amount of the fluorine-containing alignment controlling agent contained in the cholesteric liquid crystal layer composition increases sequentially from the cholesteric liquid crystal layer composition on the side of the substrate, and the blend ratio by mass of the polyfunctional polymerizable compound and the fluorine-containing alignment controlling agent contained in all the cholesteric liquid crystal layer compositions is from 50/1 to 1000/1.

19. The infrared light reflector according to claim 16, wherein the infrared light reflective layers include at least one cholesteric liquid crystal layer of reflecting a right circularly-polarized light and at least one cholesteric liquid crystal layer of reflecting a left circularly-polarized light.

20. The infrared light reflector according to claim 1, wherein an elongation at rupture of the infrared light reflective layer is at least 5%.

21. The infrared light reflector according to claim 1, wherein a stress at rupture of the infrared light reflective layer is at least 20 MPa.

22. The infrared light reflector according to claim 16, wherein the coating thickness after curing of the functional layer composition is from 1 to 10 μm.

23. The infrared light reflector according to claim 16, wherein the functional layer composition contains a polyfunctional polymerizable compound.

24. The infrared light reflector according to claim 16, wherein the contact angle to pure water on the surface of the infrared light reflective layer is from 85 to 100 degrees.

25. The infrared light reflector according to claim 16, wherein a mean value of surface energy of at least one surface of the infrared light reflective layer is at most 40 mN/m.

26. The infrared light reflector according to claim 16, wherein a standard deviation σ of a fluctuation in surface energy of at least one surface of the infrared light reflective layer is at most 0.5 mN/m.

27. The infrared light reflector according to claim 16, wherein the surface roughness Ra of at least one surface of the infrared light reflective layer is at most 50 nm.

28. The infrared light reflector according to claim 16, wherein the molecular weight of the polyfunctional polymerizable compound is from 350 to 2000.

29. The infrared light reflector according to claim 16, wherein the polyfunctional polymerizable compound contains at least one divalent aromatic ring group having from 6 to 30 carbon atoms and is non-liquid crystalline.

30. The infrared light reflector according to claim 16, wherein the polyfunctional polymerizable compound has at least two (meth)acryloyl groups.

31. The infrared light reflector according to claim 16, wherein the polyfunctional polymerizable compound has a structure represented by the following general formula (I):

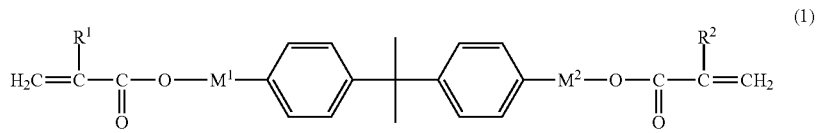

(1)

wherein $R^1$ and $R^2$ each independently represent a hydrogen atom or a methyl group; $M^1$ and $M^2$ each independently represent $-(CH_2-CH_2-O)_n-$, $-(O-CH_2-CH_2)_n-$, $-(CH_2-CH_2-CH_2-O)_m-$, $-(O-CH_2-CH_2-CH_2)_m-$, $-(CH_2)_p$ or their combination; n, m and p each independently indicate an integer of from 1 to 50.

32. The infrared light reflector according to claim 16, wherein a blend ratio by mass of the polyfunctional polymerizable compound and the fluorine-containing alignment controlling agent in the infrared light reflective layer composition is from 50/1 to 1000/1.

33. The infrared light reflector according to claim 16, wherein a blend ratio by mass of the polyfunctional polymerizable compound and the fluorine-containing alignment controlling agent in the infrared light reflective layer composition is from 60/1 to 900/1.

34. The infrared light reflector according to claim 16, wherein the viscosity of the infrared light reflective layer composition is from 0.1 to 10 mPa·s.

35. The infrared light reflector according to claim 16, wherein the total thickness of the infrared light reflective layer is from 10 to 60 μm.

36. The infrared light reflector according to claim 16, wherein an elongation at rupture of the infrared light reflective layer is at least 5%.

37. The infrared light reflector according to claim 16, wherein a stress at rupture of the infrared light reflective layer is at least 20 MPa.

* * * * *